US012593371B2

(12) United States Patent
Methenni et al.

(10) Patent No.: US 12,593,371 B2
(45) Date of Patent: Mar. 31, 2026

(54) NETWORK NODE APPARATUS AND METHODS FOR ACHIEVING END-TO-END RELIABILITY AND IMPROVING FAULT TOLERANCE IN WIRELESS SYSTEMS

(71) Applicant: InterDigital Patent Holdings, Inc., Wilmington, DE (US)

(72) Inventors: Achref Methenni, Montreal (CA); Michael Starsinic, Newtown, PA (US); Rocco Di Girolamo, Laval (CA); Ulises Olvera-Hernandez, Saint-Lazare (CA); Magurawalage Chathura Madhusanka Sarathchandra, London (GB); Saad Ahmad, Montreal (CA); Renan Krishna, Brighton (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 237 days.

(21) Appl. No.: 18/501,547

(22) Filed: Nov. 3, 2023

(65) Prior Publication Data

US 2024/0155722 A1 May 9, 2024

Related U.S. Application Data

(60) Provisional application No. 63/422,263, filed on Nov. 3, 2022.

(51) Int. Cl.
*H04W 76/20* (2018.01)
(52) U.S. Cl.
CPC ................................... *H04W 76/20* (2018.02)
(58) Field of Classification Search
CPC .............................. H04W 76/20; H04W 76/25
See application file for complete search history.

(56) References Cited

U.S. PATENT DOCUMENTS 12,413,653 B1 * 9/2025 Yi ......................... H04W 76/12
2017/0317894 A1 * 11/2017 Dao .................... H04L 41/5009
(Continued)

FOREIGN PATENT DOCUMENTS

EP          4329417 A1      2/2024
WO     2022115561 A1      6/2022

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
(Continued)

*Primary Examiner* — Kenny S Lin
(74) *Attorney, Agent, or Firm* — VOLPE KOENIG

(57) ABSTRACT

A first policy control function (PCF) in a first network node may receive an indication from a session management function (SMF) that a protocol data unit (PDU) session is an alternative PDU session, and an indication of whether the PDU session is in a drop state. The first PCF may send a message with an indication to a second PCF in a second network node to indicate that the network node is serving a PDU session that is an alternative PDU session. In an example, the message with an indication to the second PCF may also identify the PDU session. The first PCF may receive a message from the second PCF with an indication that a second PDU session has experienced a fault or degraded performance. Further, the first PCF may send a message to the SMF to change the PDU session to a no-drop state.

16 Claims, 14 Drawing Sheets

(56) References Cited

U.S. PATENT DOCUMENTS

| | | | | | |
|---|---|---|---|---|---|
| 2020/0145876 | A1* | 5/2020 | Dao | ..................... | H04L 12/1407 |
| 2020/0214054 | A1* | 7/2020 | Qiao | ................. | H04M 15/8228 |
| 2020/0382941 | A1* | 12/2020 | Lee | ....................... | H04W 76/27 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.Nov. 2020 (Dec. 3, 2020).

Interdigital, "Update to the Use Case for supporting Metaverse for Critical HealthCare Services," 3GPP TSG-SA WG1 Meeting #100, S1-223236, Toulouse, France (Nov. 14-18, 2022).

Third Generation Partnership Project, "Technical Specification Group Services and System Aspects; System architecture for the 5G System (5GS); Stage 2 (Release 17)," 3GPP TS 23.501 V17.6.0 (Sep. 2022).

Third Generation Partnership Project, "Technical Specification Group Services and System Aspects; System architecture for the 5G System (5GS); Stage 2 (Release 17)," 3GPP TS 23.501 V17.10.0 (Sep. 2023).

Third Generation Partnership Project, "Technical Specification Group Services and System Aspects; System architecture for the 5G System (5GS); Stage 2 (Release 18)," 3GPP TS 23.501 V18.3.0 (Sep. 2023).

Third Generation Partnership Project, "Technical Specification Group Services and System Aspects; Procedures for the 5G System (5GS); Stage 2 (Release 18)," 3GPP TS 23.502 V18.3.0 (Sep. 2023).

Third Generation Partnership Project, "Technical Specification Group Services and System Aspects; Procedures for the 5G System (5GS); Stage 2 (Release 17)," 3GPP TS 23.502 V17.10.0 (Sep. 2023).

Third Generation Partnership Project, "Technical Specification Group Services and System Aspects; Procedures for the 5G System (5GS); Stage 2 (Release 17)," 3GPP TS 23.502 V17.6.0 (Sep. 2022).

Third Generation Partnership Project, "Technical Specification Group Services and System Aspects; Policy and charging control framework for the 5G System (5GS); Stage 2 (Release 17)," 3GPP TS 23.503 V17.10.0 (Sep. 2023).

Third Generation Partnership Project, "Technical Specification Group Services and System Aspects; Policy and charging control framework for the 5G System (5GS); Stage 2 (Release 17)," 3GPP TS 23.503 V17.6.0 (Sep. 2022).

Third Generation Partnership Project, "Technical Specification Group Services and System Aspects; Policy and charging control framework for the 5G System (5GS); Stage 2 (Release 18)," 3GPP TS 23.503 V18.3.0 (Sep. 2023).

Third Generation Partnership Project, "Technical Specification Group Tsg Sa; Feasibility Study on Localized Mobile Metaverse Services (Release 19)," 3GPP TR 22.856 V19.1.0 (Sep. 2023).

Third Generation Partnership Project, "Technical Specification Group TSG SA; Feasibility Study on Localized Mobile Metaverse Services (Release 19)," 3GPP TR 22.856 V0.2.0 (Sep. 2022).

Third Generation Partnership Project, "Technical Specification Group Core Network and Terminals; User Equipment (UE) policies for 5G System (5GS); Stage 3 (Release 18)," 3GPP TS 24.526 V18.4.0 (Sep. 2023).

Third Generation Partnership Project, "Technical Specification Group Core Network and Terminals; User Equipment (UE) policies for 5G System (5GS); Stage 3 (Release 18)," 3GPP TS 24.526 V18.0.0 (Sep. 2022).

Third Generation Partnership Project, "Technical Specification Group Core Network and Terminals; 5G System; Session Management Services; Stage 3 (Release 18)," 3GPP TS 29.502 V18.4.0 (Sep. 2023).

Third Generation Partnership Project, "Technical Specification Group Core Network and Terminals; 5G System; Session Management Services; Stage 3 (Release 18)," 3GPP TS 29.502 V18.0.0 (Sep. 2022).

Third Generation Partnership Project, "Technical Specification Group Core Network and Terminals; 5G System; Session Management Policy Control Service; Stage 3 (Release 18)," 3GPP TS 29.512 V18.3.0 (Sep. 2023).

Third Generation Partnership Project, "Technical Specification Group Core Network and Terminals; 5G System; Session Management Policy Control Service; Stage 3 (Release 17)," 3GPP TS 29.512 V17.8.0 (Sep. 2022).

Third Generation Partnership Project, "Technical Specification Group Core Network and Terminals; 5G System; Session Management Policy Control Service; Stage 3 (Release 17)," 3GPP TS 29.512 V17.12.0 (Sep. 2023).

Third Generation Partnership Project, "Technical Specification Group Core Network and Terminals; Non-Access-Stratum (NAS) protocol for 5G System (5GS); Stage 3; (Release 18)," 3GPP TS 24.501 V18.4.0 (Sep. 2023).

Third Generation Partnership Project, "Technical Specification Group Core Network and Terminals; Non-Access-Stratum (NAS) protocol for 5G System (5GS); Stage 3; (Release 18)," 3GPP TS 24.501 V18.0.1 (Sep. 2022).

* cited by examiner

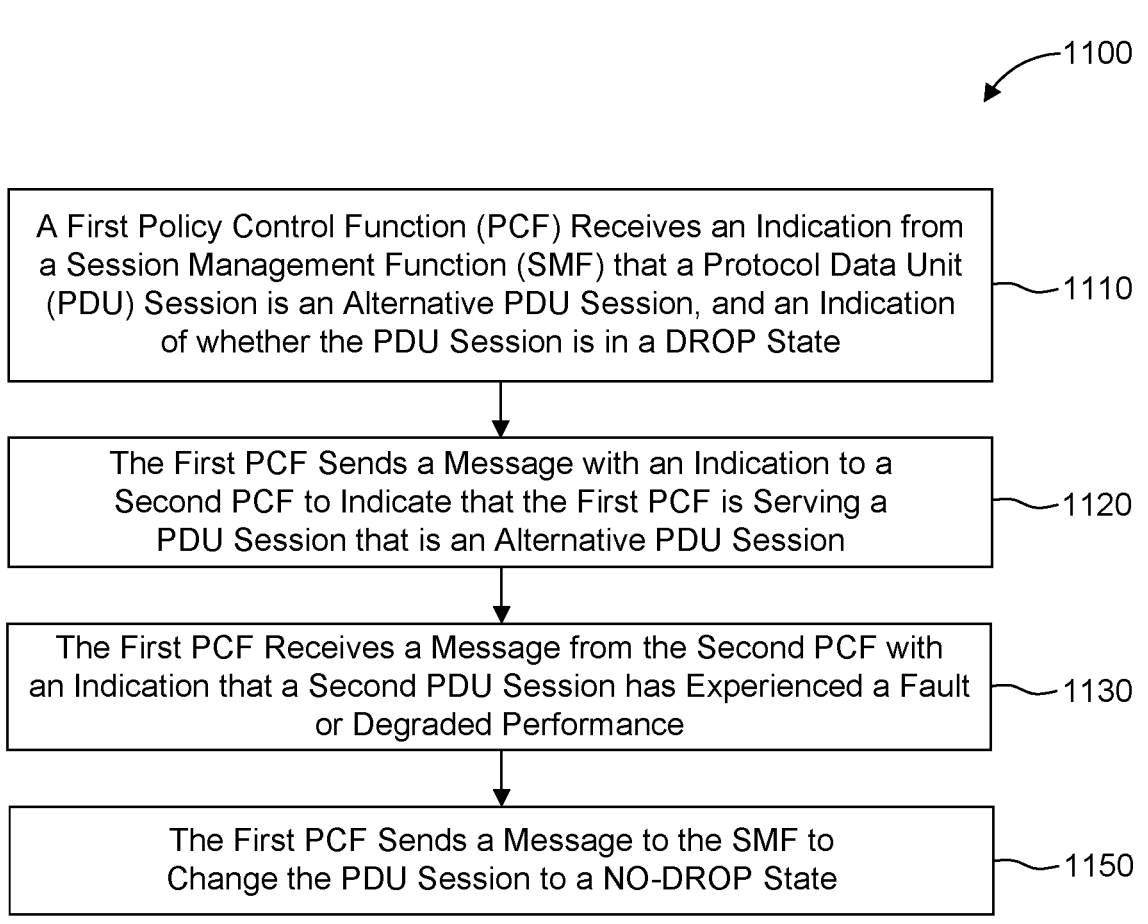

1100

A First Policy Control Function (PCF) Receives an Indication from a Session Management Function (SMF) that a Protocol Data Unit (PDU) Session is an Alternative PDU Session, and an Indication of whether the PDU Session is in a DROP State    1110

The First PCF Sends a Message with an Indication to a Second PCF to Indicate that the First PCF is Serving a PDU Session that is an Alternative PDU Session    1120

The First PCF Receives a Message from the Second PCF with an Indication that a Second PDU Session has Experienced a Fault or Degraded Performance    1130

The First PCF Sends a Message to the SMF to Change the PDU Session to a NO-DROP State    1150

FIG. 11

NETWORK NODE APPARATUS AND METHODS FOR ACHIEVING END-TO-END RELIABILITY AND IMPROVING FAULT TOLERANCE IN WIRELESS SYSTEMS

CROSS-REFERENCE TO RELATED APPLICATION

This application claims the benefit of U.S. Provisional Application No. 63/422,263, filed Nov. 3, 2022, the contents of which are incorporated herein by reference.

BACKGROUND

In order to support wireless services, such as ultra-reliable low latency communications (URLLC), a wireless transmit/receive unit (WTRU) may set up two redundant protocol data unit (PDU) sessions over the fifth generation (5G) network, such that the 5G system (5GS) sets up the user plane paths of the two redundant PDU sessions to be disjointed. In this case, the user's subscription indicates if user is allowed to have redundant PDU sessions and this indication is provided to a session management function (SMF) from unified data management (UDM). The next generation radio access network (NG-RAN) may realize redundant user plane resources for the two PDU sessions with two NG-RAN nodes, for example, a master NG-RAN and a secondary NG-RAN, or a single NG-RAN node. In both cases, there is a single N1 interface towards an access and mobility function (AMF).

The 5GS also supports redundant transmission on N3/N9 interfaces where two redundant N3/N9 tunnels with independent user plane paths are established between a user plane function (UPF) and an NG-RAN to transfer the duplicated user packets. This redundant transmission using the two N3/N9 tunnels is performed at quality of service (QoS) flow granularity which share the same QoS flow identity (ID). In this case, these packets may be transmitted via two N3 tunnels separately between a single UPF and the NG-RAN. It is assumed that the NG-RAN node and PDU session anchor (PSA) UPF shall support the packet replication and elimination function.

SUMMARY

A first policy control function (PCF) in a first network node may receive an indication from a session management function (SMF) that a protocol data unit (PDU) session is an alternative PDU session, and an indication of whether the PDU session is in a drop state. The first PCF may send a message with an indication to a second PCF in a second network node to indicate that the first network node is serving a PDU session that is an alternative PDU session. In an example, the message with an indication to the second PCF may also identify the PDU session. The first PCF may receive a message from the second PCF with an indication that a second PDU session has experienced a fault or degraded performance. Further, the first PCF may send a message to the SMF to change the PDU session to a no-drop state.

In an example, the PDU Session may be identified with any combination of a session identity (ID), a data network name (DNN), or a single network slice selection assistance information (S-NSSAI). In another example, the message with an indication to the second PCF may indicate whether the PDU Session is in the drop state.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 11 is a flow diagram illustrating an example of a policy control function (PCF) coordination for an alternative PDU session.

DETAILED DESCRIPTION

Figure 1A:
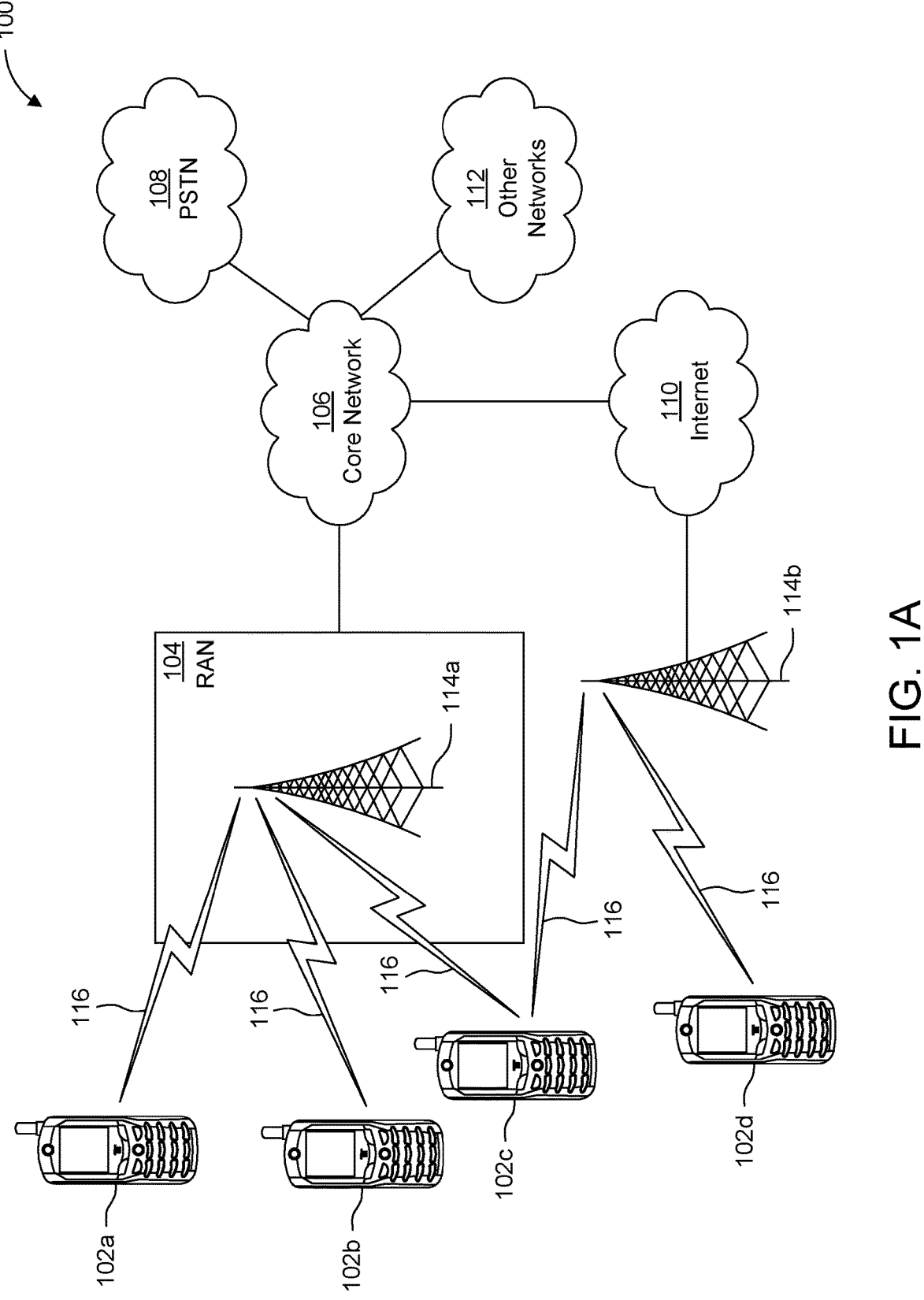
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNB and a gNB).

In other embodiments, the base station 114a and the WTRUs 102a, 102b, 102c may implement radio technologies such as Institute of Electrical and Electronics Engineers (IEEE) 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

The following abbreviations and acronyms may be used in embodiments and examples herein:
5GS 5G System
5GC 5G Core
Alt. Alternative
AMF Access and Mobility Function
API Application Programing Interface
WTRU App WTRU Application
AS Application Server
AT ATtention
CN Core Network
DL Downlink
DN Data Network
DNN Data Network Name
FRER Frame Replication and Elimination for Reliability

6

Figure 1B:
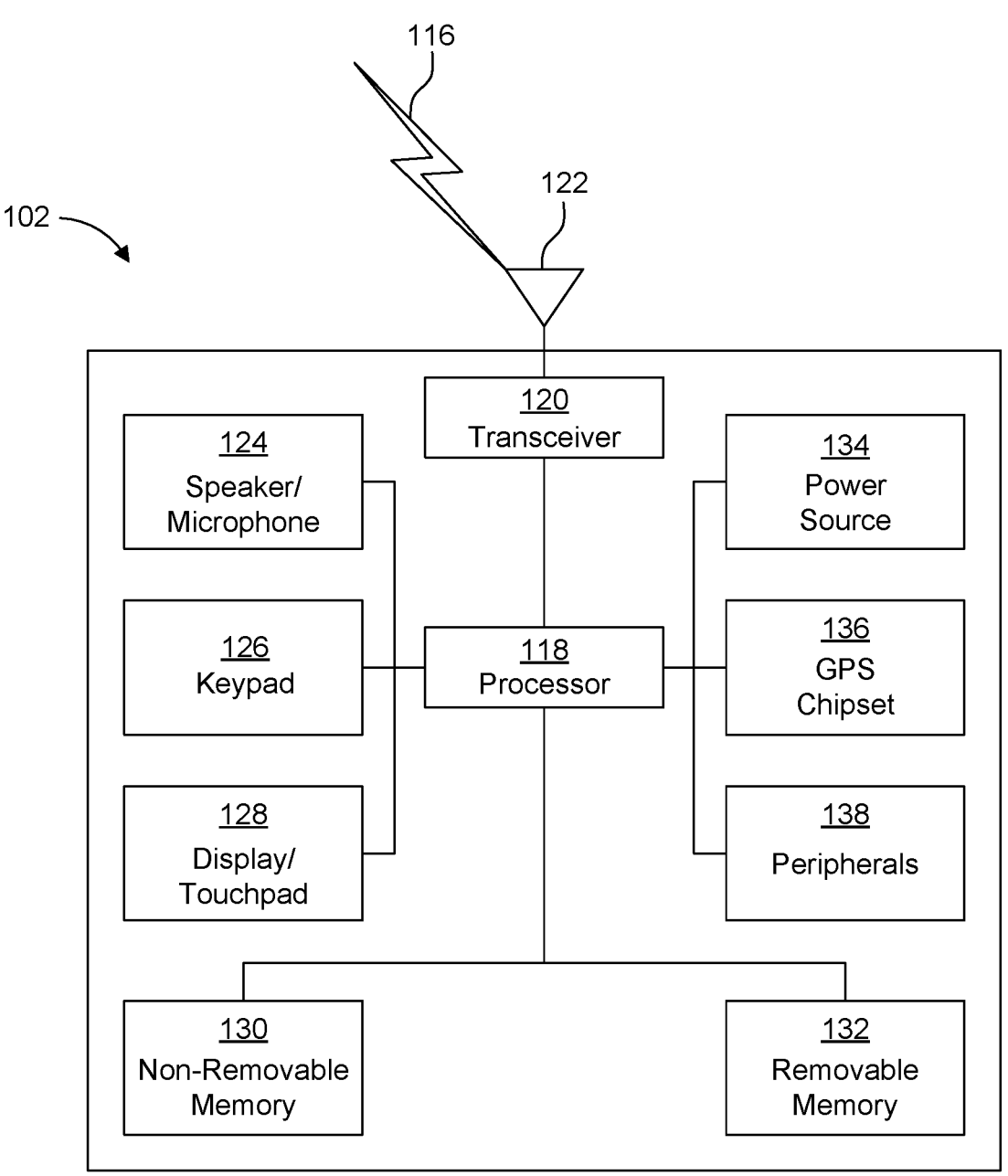
FIG. 1B is a system diagram illustrating an example wireless transmit/receive unit (WTRU) that may be used within the communications system illustrated in FIG. 1A according to an embodiment.
Figure 1C:
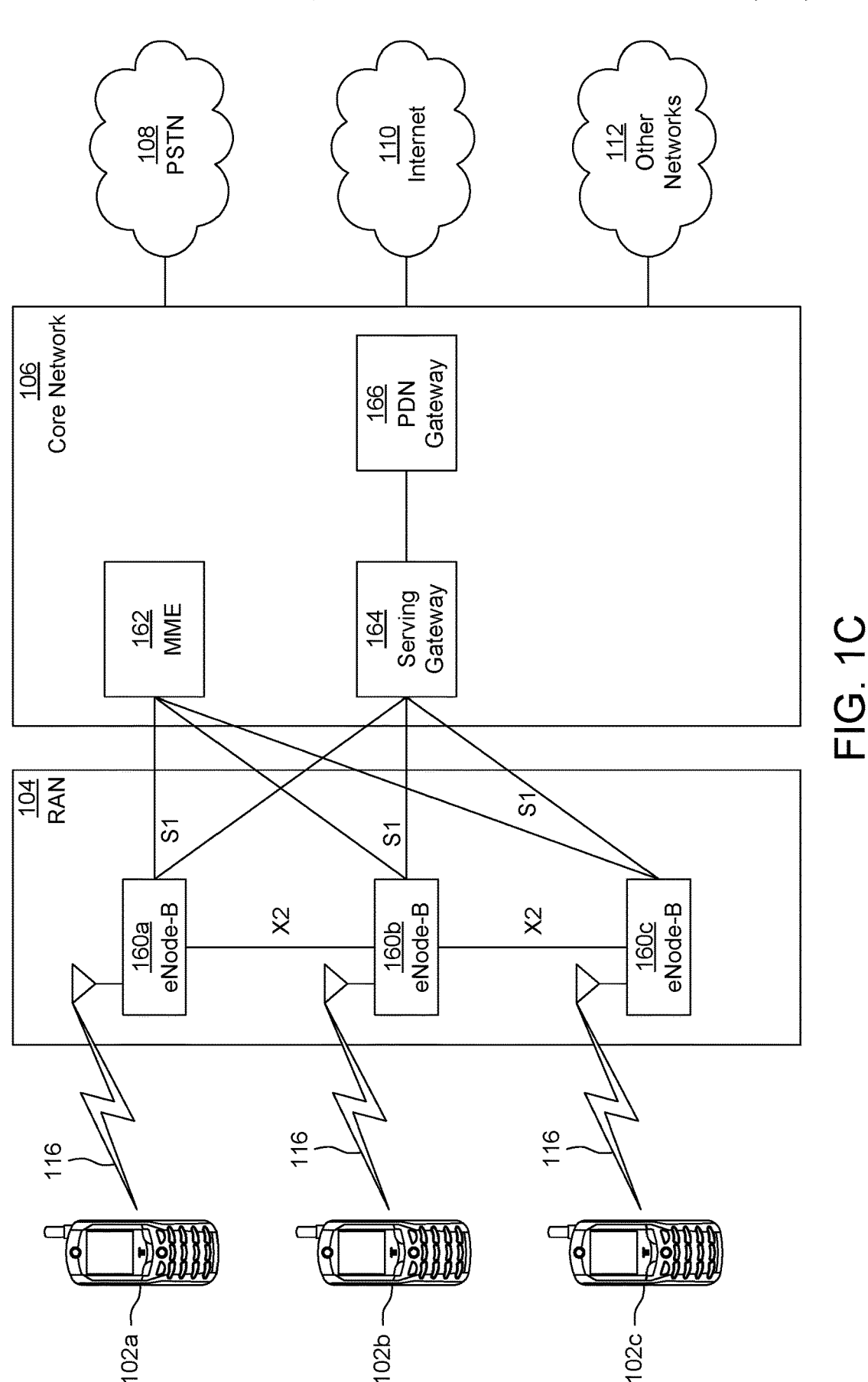
FIG. 1C is a system diagram illustrating an example radio access network (RAN) and an example core network (CN) that may be used within the communications system illustrated in FIG. 1A according to an embodiment.

GTP GPRS Tunneling Protocol
GTP-U GPRS Tunneling Protocol for User Plane
gNB gNodeB
ID Identifier
IP Internet Protocol
MT Mobile Terminal
NAS Non-Access Stratum
NAS-MM NAS-Mobility Management
NAS-SM NAS-Session Management
NEF Network Exposure Function
NG-RAN Next Generation Radio Access Network
NR New Radio
PCC Policy Charging and Control
PCF Policy Control Function
PDU Protocol Data Unit
PSA PDU Session Anchor
QoE Quality of Experience
QoS Quality of Service
RAN Radio Access Network
RFSP RAT/Frequency Selection Priority
RRC Radio Resource Control
RRM Radio Resource Management
RSD Route Selection Descriptor
SM Session Management
SMF Session Management Function
S-NSSAI Single Network Slice Selection Assistance Information
TSN Time Sensitive Networking
TE Terminal Equipment
UCU WTRU Configuration Update
UDM Unified Data Management
UDP User Datagram Protocol
WTRU User Equipment
UL Uplink
UPF User Plane Function
URLLC Ultra Reliable Low Latency Communications
URSP WTRU Route Selection Policy FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an embodiment, the WTRU 102 may include a half-duplex radio for which transmission and reception of some or all of the signals (for example, associated with particular subframes for either the UL (for example, for transmission) or the DL (for example, for reception)).

Figure 10:
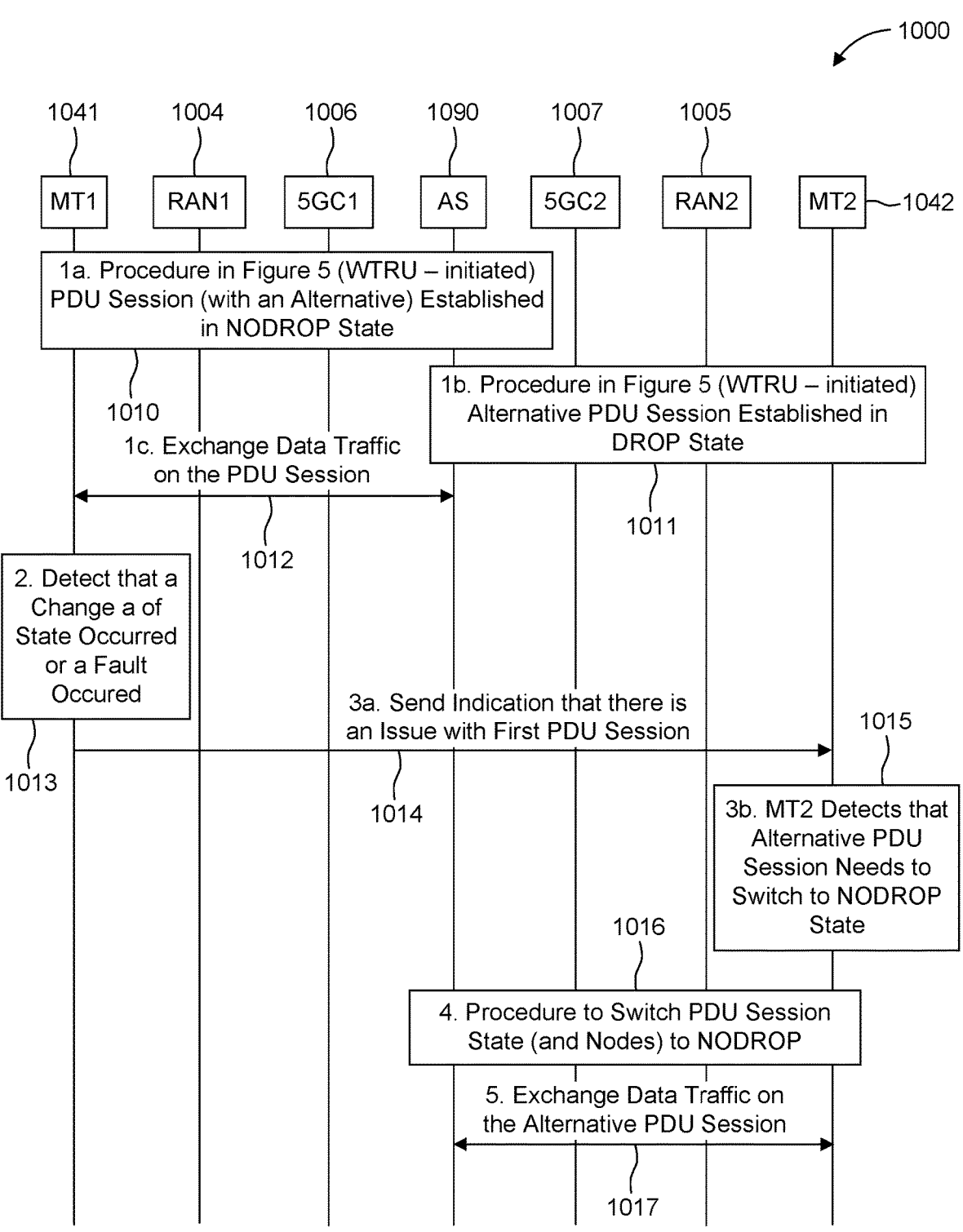
FIG. 10 is a signaling diagram illustrating an example of a PDU session creation and state change procedure with WTRU coordination.

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN

106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (for example, 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
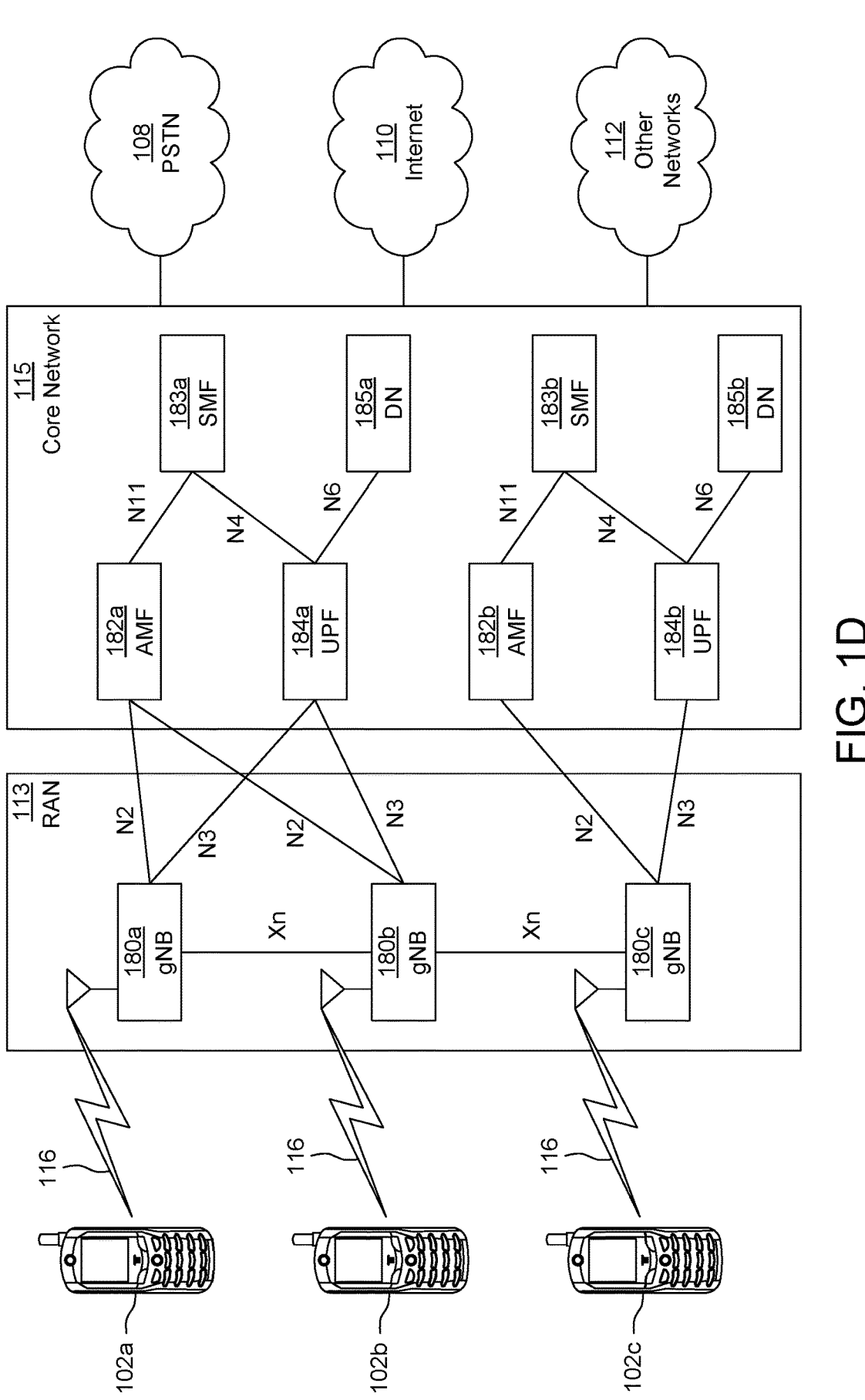
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (for example, containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry, for example, which may include one or more antennas, may be used by the emulation devices to transmit and/or receive data.

Figure 2:
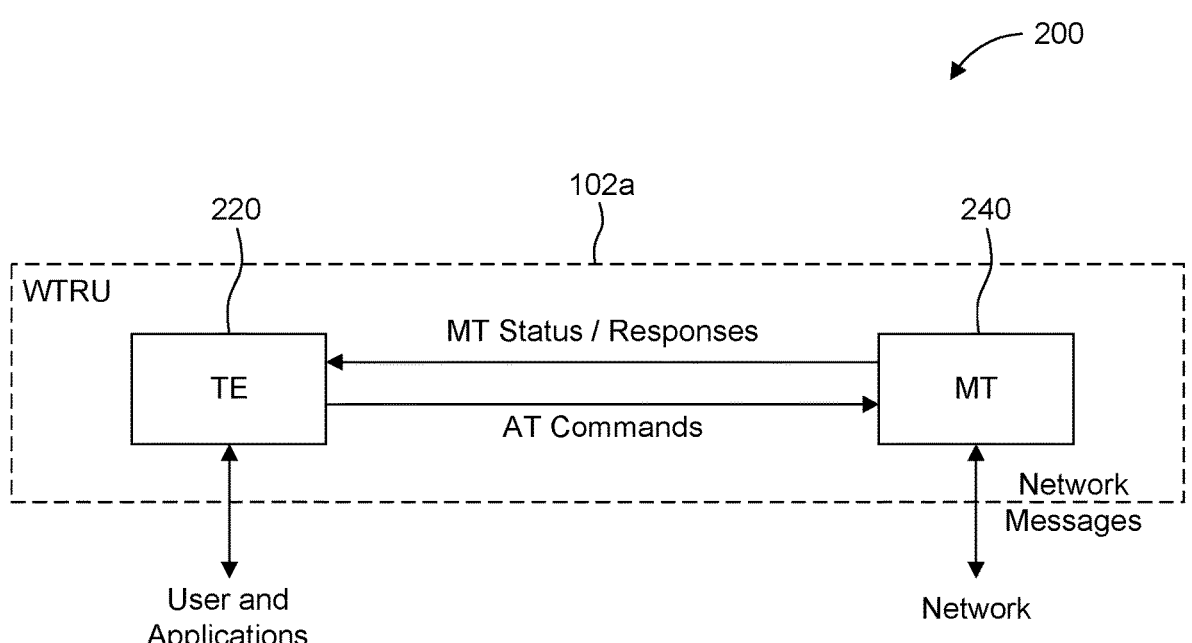
FIG. 2 is a system diagram illustrating an example WTRU with terminal equipment (TE) and mobile termination (MT) interaction via attention (AT) commands.

FIG. 2 is a system diagram illustrating an example WTRU with terminal equipment (TE) and mobile termination (MT) interaction via attention (AT) commands. As shown in an example in FIG. 2, a WTRU, such as WTRU 102a, may be comprised of two functional components. A first functional component may be a TE 220 which is a part of the WTRU 102a that may host some WTRU 102a applications and processes. The TE 220 part controls MT 240 functions and network services through an intermediate node called Terminal Adaptor (TA). Although not shown explicitly in FIG. 2, the TA may be located between TE 220 and MT 240. The TE 220 can communicate and control the MT 240 via AT commands.

End to end redundant user plane paths may be based on dual connectivity. In order to support wireless services, such as URLLC, a WTRU may set up two redundant PDU sessions over the fifth generation (5G) network, such that the 5G system (5GS) sets up the user plane paths of the two redundant PDU sessions to be disjointed. In an example, the WTRU may be WTRU 102a. In this case of two redundant PDU sessions with disjointed use plan paths, the user's subscription indicates if the user is allowed to have redundant PDU sessions and this indication is provided to an SMF from unified data management (UDM). The next generation RAN (NG-RAN) may realize redundant user plane resources for the two PDU sessions with two NG-RAN nodes, for example, a master NG-RAN and a secondary NG-RAN, or a single NG-RAN node. In both cases, there is a single N1 interface towards an AMF.

The 5GS also supports redundant transmission on N3/N9 interfaces where two redundant N3/N9 tunnels with independent user plane paths are established between a UPF and an NG-RAN to transfer the duplicated user packets. This redundant transmission using the two N3/N9 tunnels is performed at QoS flow granularity which share the same QoS flow identity (ID). In this case, these packets may be transmitted via two N3 tunnels separately between a single UPF and the NG-RAN. It is assumed that the NG-RAN node and PDU session anchor (PSA) UPF shall support the packet replication and elimination function.

Additionally or alternatively, the 5GS may support redundant transmission at the transport layer. In this scenario, redundancy can be supported between the RAN and UPF at the transport layer or UDP layer. In other words, it can be done without 3GPP specification impact. In this case, for an established PDU session for URLLC services between the WTRU and network, an SMF selects a UPF that supports redundant transmission at the transport layer for the PDU session, based on data network name (DNN), single network slice selection assistance information (S-NSSAI), knowledge of supporting redundant transmission at transport layer, and the like. Here, one N3 general packet radio service (GPRS) tunneling protocol for user plane (GTP-U) tunnel is established between UPF and NG-RAN. For DL data transmission, the redundancy functionality in the UPF duplicates the DL data on the transport layer. On the other hand, for UL data transmission, the redundant functionality in the NG-RAN performs the redundant handling on the backhaul transport layer for UL. In this case, it is assumed that the NG-RAN node and UPF shall support the packet replication and elimination function.

Redundant user plane paths may be based on multiple WTRUs per device. One approach to realize multiple user plane paths in the system is based on a device having multiple WTRUs and specific network deployments. The approach assumes a RAN deployment where redundant coverage by multiple gNBs, in the case of NR, or redundant coverage by multiple base stations, is generally available. Upper layer protocols, such as the IEEE 802.1 time sensitive networking (TSN), can make use of the multiple user plane paths.

In this scenario, the WTRUs belonging to the same terminal device request the establishment of PDU Sessions that use independent RAN and CN network resources. The following assumptions are used to enable this scenario. RAN coverage is redundant in the target area: it is possible to connect to multiple gNBs or multiple base stations from the same location. The selection of different gNBs or base stations for the WTRUs in the same device is realized by the concept of WTRU reliability groups for the WTRUs and also for the cells of gNBs or base stations.

An example realization can be as follows: the WTRU's Allowed NSSAI can be used as input to select the RAT/Frequency Selection Priority (RFSP) index value for the WTRU. The RAN node uses the RFSP for radio resource management (RRM) purposes and can be based on local configuration to determine the WTRU's reliability group based on the S-NSSAI in the Allowed NSSAI and/or the S-NSSAI for the PDU session(s).

Frame replication and elimination for reliability (FRER) is a standard conceived to provide high reliability, and was first conceived in the context of time sensitive networking (TSN). The FRER mechanism provides identification and replication of frames for redundant transport over multiple paths. When received, the duplicate frames can be identified based on sequence numbering, and the duplicates are eliminated.

The mechanism can be configured in a flexible way. It is possible to apply more than two paths for additional redundancy. A FRER entity can play the replication role and the elimination role at the same time for the two different directions.

In typical deployments, the FRER functionality is set up using management protocols, and controlled by a centralized entity. Note that it is possible to set up FRER functionality both at intermediate switches, or at end hosts, even though the central controller and the management protocol may differ. There can be multiple replication and elimination points defined for a flow depending on the requirements and the network characteristics.

A new feasibility study in the 3GPP SA1 working group has started titled Localized Mobile Metaverse Services, such as in 3GPP TR 22.856. A use case of interest in this study is the use of Metaverse for Critical HealthCare Services. In this use case, it is advocated that some critical healthcare scenarios will take advantage for immersive interactive mobile services. Such scenarios include immersive remote surgery, metaverse physician consultation, metaverse body scan and vitals and so on. The scenario of Immersive remote surgery describes doctors who are far away from a patient's location, in need of urgent surgery, and how the doctors perform the surgery virtually on the patient. One potential new requirement related to this use case was described as "The 5G system shall provide fault tolerant reliable end to end support for critical HealthCare services."

In embodiments and examples provided herein, new functionality is described to improve reliability and fault tolerance without a significant increase in the amount of radio resources that are consumed by a communications device. As described above, in order to improve reliability of application layer data transmission and reception, the 5G System supports dual connectivity based end-to-end redundant user plane paths. A drawback of using this feature to improve reliability is that the approach contains multiple single points of failure. For example, the approach relies on a single AMF node and all data is routed towards a single data network.

Also, as described above, a communication device could include WTRUs. Each WTRU, such as WTRU 102a, may be used to transmit and receive the same application data.

Application layer protocols may be used to discard redundant data. Assuming that each WTRU connects to a different network, such an approach will be more reliable than the dual connectivity based end-to-end redundant user plane paths approach because it includes fewer single points of failure. The decrease in the number of points of failure is due to the fact that each WTRU would utilize different network nodes, (for example, AMFs. Also, depending on the configuration of each WTRU, the data that is sent and received by each WTRU may traverse different N6 data networks. However, a drawback of this approach is that the amount of radio resources that are required to transmit and receive the data may be twice that of a communication device that includes only one WTRU.

Methods are thus desired that improve the reliability and fault tolerance of an application layer session without significantly increasing the amount of radio resources that are required by the communication device that hosts the application. In other words, it is desired that a communication device that requires high reliability not utilize significantly more radio resources than a communication device that host the same type of application layer session but takes no steps to improve reliability.

In embodiments and examples provided herein, increasing the fault tolerance of an application layer session may mean decreasing the number of single points of failure that are associated with the communication device that hosts the application layer session.

Embodiments and examples provided herein introduce a new concept of alternative PDU sessions for dual WTRUs in a device and introduces a PDU session state of DROP or NO-DROP. For instance, embodiments and examples provided herein describe procedures to create and prepare PDU sessions that are alternative and to set up their state to either DROP or NO-DROP. Also, embodiments and examples provided herein describe procedures that may be used by the network, triggered by the WTRU to change the state of a PDU session. Further, embodiments and examples provided herein describe procedures to change a PDU session to an alternative PDU session and describes a change of PDU session state, such as from a DROP state to a NO-DROP state, by assistance of the application server (AS). Moreover, embodiments and examples provided herein describes a procedure that may be used by the networks hosting each PDU session, for dual WTRUs in a device, to coordinate a PDU session change of state. Additionally, embodiments and examples provided herein describe a procedure that may be used by the two MTs in the WTRU to coordinate a change of state of a PDU session.

An example solution includes an alternative PDU session feature. Further, examples provided herein include WTRU support. In an example, a WTRU may establish a PDU session with a network. The WTRU may receive an indication from the network that the PDU session is an alternative PDU session and may determine if the PDU session is in a DROP state, wherein the WTRU does not transmit data that is associated with the PDU session when the PDU session is in the DROP state. Further, the WTRU may detect that the PDU session is no longer in the DROP state and may determine to transmit data that is associated with the PDU session.

When the WTRU establishes the PDU session with the network or when the WTRU request a modification of the PDU session, the WTRU may indicate to the network, in the PDU Session Establishment Request message or PDU Session Modification Request message that the PDU session is an alternative PDU session.

The WTRU may be triggered to establish or modify the PDU session and to make the PDU session an alternative PDU session by an application invoking an AT Command that requests to use an alternative PDU session.

The WTRU may be triggered to establish or modify the PDU session and to make the PDU session an alternative PDU session by detecting that application traffic matches a traffic descriptor in a UE route selection policy (URSP) rule or WTRU route selection policy rule. The WTRU may receive the indication that a PDU session is an alternative PDU session in a PDU Session Establishment Accept message or a PDU Session Modification Command message. The WTRU may determine that the PDU session is in a DROP state based on an indication in a PDU Session Establishment Accept message or a PDU Session Modification Command message. The WTRU may determine that the PDU session is no longer in the DROP state based on an indication from an application that is provided to the MT part of the WTRU in an AT Command. Further, the WTRU may determine that the PDU session is no longer in the DROP state based on receiving downlink data that is associated with the PDU session.

Examples provided herein include SMF support. In an example, an SMF may receive a request to make a PDU session an alternative PDU session. The SMF may send an indication to a network node that a PDU session is an alternative PDU session and an indication of whether the PDU session is in a DROP state. Further, the SMF may send an indication to the WTRU that the PDU session is an alternative PDU session. Also, the SMF may receive an indication that the PDU session is no longer in the DROP state. Further, the SMF may send a notification to the network node that the PDU session is no longer in the DROP state.

In an example, the network node may be a RAN node and the indications may be sent to the RAN Node by the SMF in an N2 message. Further, the network node may be a UPF node and the indications may be sent to the UPF Node by the SMF in an N4 message.

Further, the request to make a PDU session an alternative PDU session may be received in a PDU Session Establishment Request message or PDU Session Modification Request message. The indication to the WTRU that the PDU session is an alternative PDU session may be sent in a PDU Session Establishment Accept message or a PDU Session Modification Command message. The indication that the PDU session is no longer in the DROP state is received in a PDU Session Modification Command. The indication that notification to the UPF that the PDU session is no longer in the DROP state is sent in an N4 message. The request to make a PDU session an alternative PDU session may be received from a policy control function (PCF). The request to make a PDU session an alternative PDU session may be received from a network exposure function (NEF).

Examples provided herein include a data plane network node that supports the alternative PDU session feature. In examples, the data plane network node may be a UPF or a RAN node. In an example, the data plane network node may receive an indication from an SMF that a PDU session is an alternative PDU session and an indication of whether the PDU session is in a DROP state. Also, the data plane network node may detect that the PDU session is no longer in the DROP state. Further, the data plane network node may send a notification to the SMF that the PDU session is no longer in the DROP state.

The network node may be a RAN node and the indications may be received by the RAN Node from the SMF in an N2 message. The network node may be a UPF and the indications may be received by the UPF Node from the SMF in an N4 message.

In an example, the UPF, or the RAN Node, may detect that the PDU session is no longer in the DROP state is based on receiving uplink or downlink data that is associated with the PDU session. Further, the UPF or the RAN Node may detect that the PDU session is no longer in the DROP state is based on applying packet detection rules to downlink or uplink date.

Examples provided herein include PCF coordination for an alternative PDU session. In an example, a first PCF may receive an indication from an SMF that a PDU session is an alternative PDU session and an indication of whether the PDU session is in a DROP state. Further, the first PCF may send a message with an indication to a second PCF to indicate that the first PCF is serving a PDU session that is an alternative PDU session, wherein the message also identifies the PDU session. Also, the first PCF may receive a message from the second PCF with an indication that a second PDU session has experienced a fault or degraded performance. Further, the first PCF may send a message to an SMF to change the PDU session to a NO-DROP state.

In an example, the PDU session may be identified with any combination of a Session ID, a DNN, or an S-NSSAI. Also, the message with an indication to a second PCF may be indicated if the PDU session is in the DROP state.

Embodiments and examples provided herein discuss how to improve the fault tolerance and reliability of a communication device. In most of the examples herein, the communication device is a device that physically hosts two or more WTRUs or two or more MTs. It should be appreciated that the same improvements could be applied to a deployment where two separate communication devices are deployed to achieve fault tolerance and reliability. For example, a first communication device may host one WTRU and perform a function such as display content while a second communication device may host a second WTRU, serve as a backup to the first communication device, and be capable of displaying the same content as the first communication device.

Example solutions provided herein introduce the concept of an alternative PDU session. An alternative PDU session serves an alternate to a first PDU session. The first PDU session and the alternative PDU session may terminate at the same or different WTRUs. The alternative PDU session is a PDU session that is available for sending and receiving data to the same data network as what is sent and received via the first PDU session.

The alternative PDU session may be kept in a DROP or NO-DROP state. In the DROP state, the data from the PDU session is dropped, or discarded, by the WTRU, RAN Node, or a UPF so that the data is not sent over the air and does not consume any radio resources. In the NO-DROP state, the data from the PDU session is not dropped, or discarded, and is allowed to travel through the PDU session.

The alternative PDU session is triggered by the WTRU or the network to transition from the DROP state to the NO-DROP state when it is detected that the first PDU session has experienced some problem. One or more example problems may include, a high number of dropped packets or the failure of a network node that is associated with the network that serves the first PDU session). Alternatively or additionally, a WTRU or AS may subscribe to be notified when there is failure in a core network. In such a case, the 5GC may notify the WTRU and/or AS that a failure has occurred and the alternative PDU state session can be triggered to transition from a DROP state to a NO-DROP state. Similarly, the 5GC may notify the WTRU and/or AS that a failure condition in the core network has been resolved. This allows the WTRU and/or AS to trigger a transition of the alternate PDU session from a NO-DROP state to a DROP state. As another alternative or addition, the WTRU and AS may determine to transition from a DROP state to a NO-DROP state based on knowledge of the traffic being carried in the flow. For example, a flow may have a burst of traffic that is more important than other traffic. In such a case, the WTRU and AS may decide to proactively transition traffic from a DROP state to a NO-DROP state to protect the important traffic.

The alternative PDU session may be triggered by the WTRU or the network to transition from the NO-DROP state to the DROP state when it is detected that the first PDU session is no longer experiencing a problem. One or more example problems that the PDU is no longer experiencing may include that the number of dropped packets is below a threshold or failure conditions that were associated with the network that serves the first PDU session have been resolved.

The first PDU session may also transition between the DROP and NO-DROP states. However, the first PDU session may be established with a preferred network and always used unless and until some problem is detected with the first PDU session or with the network that serves the first PDU session.

Figure 3:
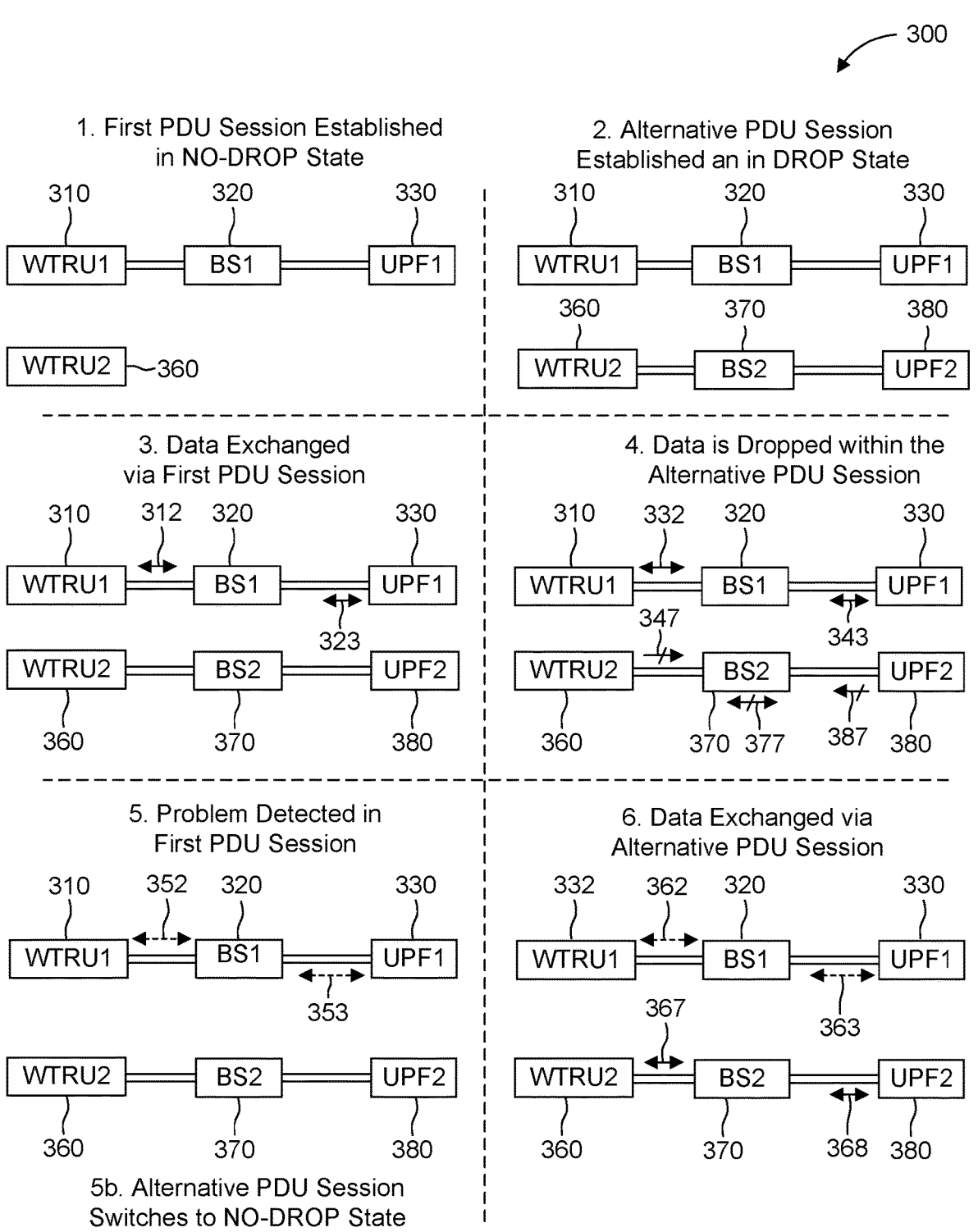
FIG. 3 is a diagram illustrating an example of alternative protocol data unit (PDU) session establishment and state changes.

FIG. 3 is a diagram illustrating an example of alternative PDU session establishment and state changes. As example shown in diagram 300 illustrates a process of switching between the drop and no-drop states. For example, in a first step, a first PDU session is established using the first terminal with a RAN node and a 5GC (5GC1). In an example, the first terminal may be a WTRU, such as WTRU1 310, and the RAN node may be a base station, such as BS1 320. In another example, the first terminal may be a UE, such as UE1 and the RAN node may be a gNB, such as gNB1. Further, WTRU1 may be a WTRU shown in examples in FIG. 1, such as WTRU 102a. This PDU session is then put in a NO-DROP state, meaning that all entities, for example, WTRU1 310, BS1 320 and UPF1 330, that serve this PDU session do not intentionally drop data. In examples shown in FIG. 3, UPF1 330 may be in a 5GC, such as 5GC1. Further, in case of congestion at a certain node, dropping packets can still occur, which is different from dropping data according to the DROP state introduced herein.

In a second step, which can occur in parallel to the first step, a second terminal WTRU2 360, establishes a PDU session that is alternative to the first PDU session which was established by WTRU1 310. WTRU2 360 may establish this alternative PDU session with BS2 370 and UPF2 380. This alternative PDU session is put in a DROP state. Since this alternative PDU session, or second PDU session, is in the DROP state, the WTRU2 360 will not transmit data that is associated with the alternative PDU session and either the UPF2 380 or BS2 370 will drop data that is associated with this alternative PDU session. In an example, BS2 370 may be a gNB. In another example, BS2 370 may be another type of base station.

In the third and fourth steps, data is exchanged using the first PDU session since it is in a NO-DROP state. For example, in the third step, data transmission 312 is exchanged between WTRU1 310 and BS1 320. Further, data transmission 323 is exchange between BS1 320 and UPF1 330. In an example in the third step, WTRU1 310 may transmit data transmission 312 to BS1 320. Also, BS1 320 may transmit data transmission 323 to UPF1 330. Data 323 may include some of all or data 312, in an example.

In an additional or alternative example in the third step, UPF1 330 may transmit data transmission 323 to BS1 320. Additionally, BS1 320 may transmit data transmission 312 to WTRU1 310. Accordingly, data 312 may include some or all of data 323.

In the fourth step, data that is associated with the alternative PDU session is dropped as described above. The WTRU2 360 may stay registered with 5GC2 as long as it has an alternative PDU session, either in a DROP state or a NO-DROP state, and as long as the WTRU2 360 does not delete registration due to inactivity, for example in a NO-DROP state. In an example in the fourth step, WTRU2 360 may drop data 347 for transmission to BS2 370. In another example in the fourth step, UPF2 380 may drop data 387 for transmission to BS2 370. Similarly, BS2 370 may drop data 377 for transmission to UPF2 380. Additionally or alternatively, BS2 370 may drop data 377 for transmission to WTRU2 360.

In embodiments and examples provided herein, dropping data may include that a RAN node may decide to stop transmitting data that is scheduled to be transmitted upon reception and determination of the status switch to a DROP state. For example, when WTRU2 360 drops data 347 for transmission to BS2 370, WTRU2 360 may stop transmitting data that is scheduled to be transmitted. In another example, when UPF2 380 drops data 387 for transmission to BS2 370, UPF2 380 may stop transmitting data that is scheduled to be transmitted. Similarly, when BS2 370 drops data 377 for transmission, BS2 370 may stop transmitting data that is scheduled to be transmitted.

Additionally, or alternatively, in embodiments and examples provided herein, dropping data may include that the RAN node may also stop scheduling the corresponding traffic altogether for this service data. For example, when WTRU2 360 drops data 347 for transmission to BS2 370, WTRU2 360 may stop scheduling traffic altogether for this service data. In another example, when UPF2 380 drops data 387 for transmission to BS2 370, UPF2 380 may stop scheduling traffic altogether for this service data. Similarly, when BS2 370 drops data 377 for transmission, BS2 370 may stop scheduling traffic altogether for this service data.

In step 5, a problem is detected with the first PDU session. In this step, the device or network detects that there is a problem with the first PDU session and determines to trigger the alternative PDU session to move into a NO-DROP state. For example, WTRU1 310 may detect that there is a problem with the first PDU session. Accordingly, WTRU1 310 may then determine to trigger the alternative PDU session to move into the NO-DROP state. Additionally or alternatively, BS1 320 may detect that there is a problem with the first PDU session. As a result, BS1 320 may then determine to trigger the alternative PDU session to move into the NO-DROP state. Additionally or alternatively, UPF1 330 may detect that there is a problem with the first PDU session. Consequently, UPF1 330 may then determine to trigger the alternative PDU session to move into the NO-DROP state.

In an example, WTRU1 310 may be scheduled to transmit data transmission 352 to BS1 320, and WTRU1 310 may then determine to trigger the alternative PDU session. Accordingly, WTRU1 310 does not transmit data transmission 352, or does not complete the transmission of data transmission 352, as scheduled. Additionally or alternatively, BS1 320 may be scheduled to transmit data transmission 352 to WTRU1 310, and BS1 320 may then determine to trigger the alternative PDU session. As a result, BS1 320 does not transmit data transmission 352, or does not complete the transmission of data transmission 352, as scheduled.

In an additional or an alternative example, BS1 320 may be scheduled to transmit data transmission 353 to UPF1 330, and BS1 320 may then determine to trigger the alternative PDU session. Consequently, BS1 320 does not transmit data transmission 353, or does not complete the transmission of data transmission 353, as scheduled. Additionally or alternatively, UPF1 330 may be scheduled to transmit data transmission 353 to BS1 320, and UPF1 330 may then determine to trigger the alternative PDU session. Therefore, UPF1 330 does not transmit data transmission 353, or does not complete the transmission of data transmission 353, as scheduled.

When the device detects that there is a problem with the first PDU session, the detection may be made by an application that is hosted in the same device that encompasses WTRU1 310 and WTRU2 360. In an example, the application may be pre-configured. Additionally or alternatively, the application may be dynamically configured.

In step 6, due to this switch in state for the alternative PDU session, data that is related to the alternative PDU session is no longer dropped and allowed to be transmitted over the air. Data might still be sent and received from the WTRU1 310 to a UPF1 330 via the first PDU session and the application layer protocol may determine to discard duplicate packet. For example, in step 6, data may be exchanged via the alternative PDU session, such as WTRU2 360 transmitting data transmission 367 to BS2 370, which in turn transmits t data transmission 368 to UPF2 380. Additionally or alternatively, data may be exchanged via the alternative PDU session when UPF2 380 transmits data transmission 368 to BS2 370, which in turn transmits data transmission 367 to WTRU2 360, in an example.

During this data exchange in step 6, WTRU1 310 may still transmit data transmission 362 to BS1 320, which in turn may transmit data transmission 363 to UPF1 330. Additionally or alternatively, UPF1 330 may transmit data transmission 363 to BS2 320, which may in turn transmit data transmission 362 to WTRU2 310. In an example, the application layer protocol may determine that the packet is a duplicate and may determine to discard the packet.

One example approach to improving fault tolerance and reliability is to enhance the WTRU and network so that the WTRU and network are aware when a WTRU is hosted in a communication device with other WTRU(s) that are used to send and receive the same data. Examples and embodiments provided herein explicitly describe a scenario where the communication device hosts two WTRUs. However, it can be appreciated that the solutions can be extended to a communication device that uses more than two WTRU to send and receive the same data.

Figure 4:
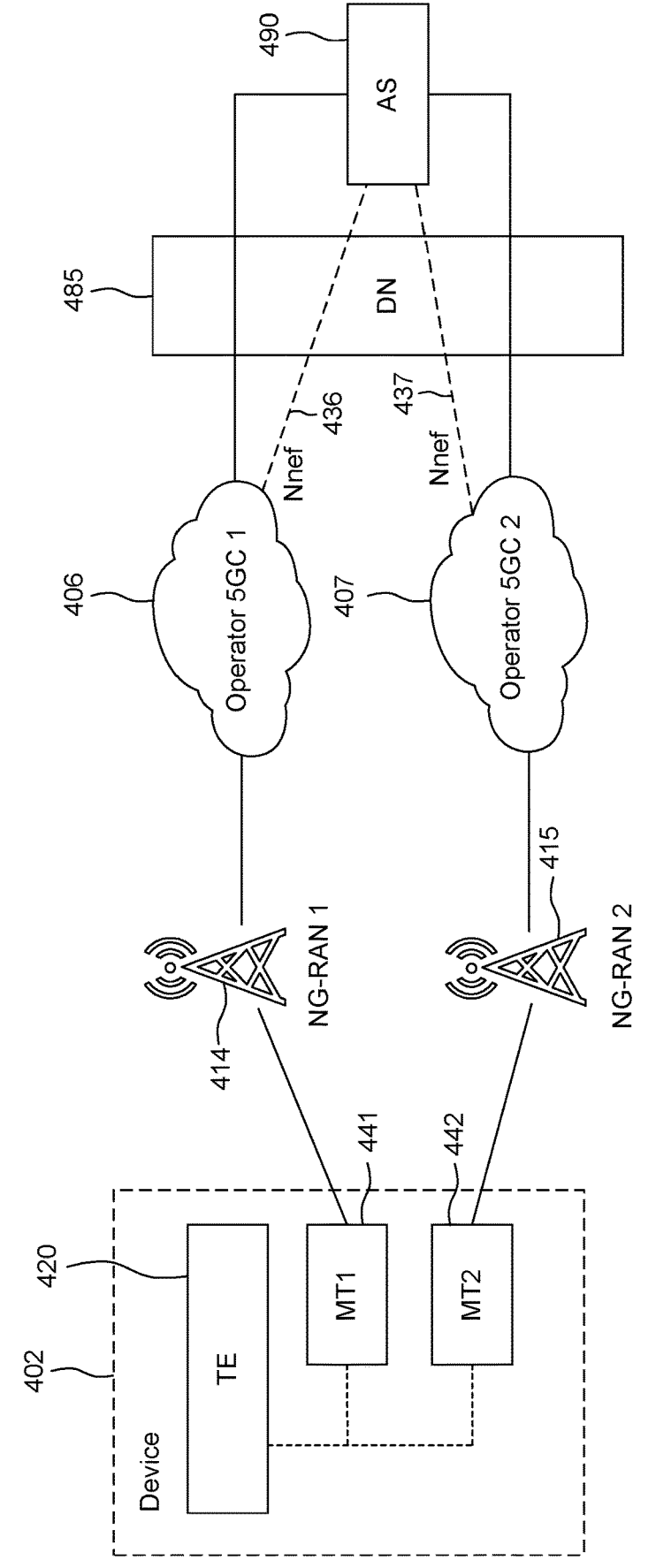
FIG. 4 is a system diagram illustrating an example of a communication device with multiple mobile terminals in a system.

FIG. 4 is a system diagram illustrating an example of a communication device with multiple MTs in a system. As seen in an example in system diagram 400, the WTRUs in the device might be independent. In the context of these solutions, independent means that the MT parts of the WTRU do not communicate directly. In other words, within the communication device, there is no interface between the MT parts of the WTRU within. Rather, any coordination between the MTs of each WTRU is done via an application or within the TE.

For example, in device 402, MT1 441 and MT2 442 may not communicate directly. Instead, any communication or coordination between MT1 441 and MT2 442 may be done through TE 420. Accordingly, device 402 may contain independent WTRUs.

The application may be hosted in the TE part of one of the WTRUs or hosted in a TE that is common to both MTs. For example, the application may be hosted in TE 420.

In the context of these solutions, independent may also mean that there is no direct communication between the network nodes of the network that serve each WTRU; in other words, there is no direct communication to coordinate what data is sent to each WTRU. Any network side coordination may take place via an AS that communicates with the networks that serve each WTRU.

For example, MT1 441 may communicate with NG-RAN 1 414, which may in turn communicate with operator 5GC 1 406. Operator 5GC 1 406 may communicate with AS 490 through DN 485 over an Nnef 436 link. Further, MT2 442 may communicate with NG-RAN 2 415, which may in turn communicate with operator 5GC 2 407. Operator 5GC 2 407 may communicate with AS 490 through DN 485 over an Nnef 437 link. Accordingly, network side coordination may take place via AS 490. As a result, NG-Ran 1 414 may not coordinate with NG-RAN 2 415, or with operator 5GC 2 407. Similarly, NG-Ran 2 415 may not coordinate with NG-RAN 1 414, or with operator 5GC 1 406. Likewise, operator 5GC 1 406 may not coordinate with operator 5GC 2 407. In this way, no network side coordination may take place via outside of AS 490.

In the examples of this provided herein, alternative PDU sessions are established and events trigger the WTRU or network nodes to change the state of the PDU sessions between a DROP state and a NO-DROP state. In examples, the WTRU and network nodes may communicate with each other regarding the change of state.

Examples are provided herein of creating an alternative PDU session. In an example, the WTRU may initiate creation of an alternative PDU session. In embodiments and examples provided herein, an indication may be sent in indication information.

Figure 5:
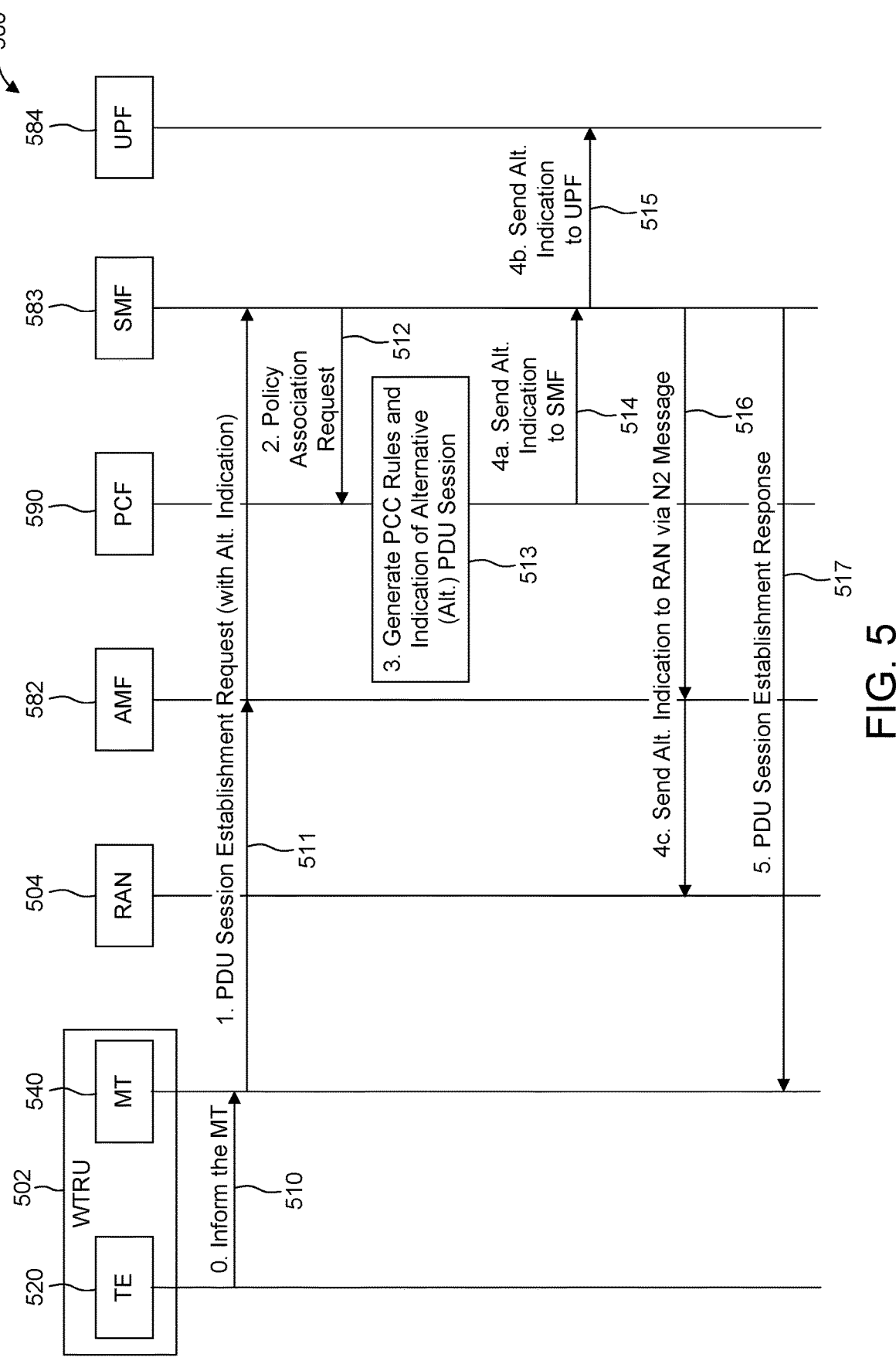
FIG. 5 is a signaling diagram illustrating an example of a WTRU initiated alternative PDU session.

FIG. 5 is a signaling diagram illustrating an example of a WTRU initiated alternative PDU session. An example in signaling diagram 500 shows a procedure for configuring alternative PDU sessions. This example procedure is initiated by the WTRU 502. This procedure applies to both a PDU session that is alternative and to a PDU session that has an alternative. In other words, both MTs in the WTRU 502 device may execute this procedure.

In step 0 510, an application that is hosted in the WTRU 502 device, (for example, in a TE 520, determines that an alternative PDU session is needed. The application in the TE part 520 of the WTRU 502 might inform the MT part 540 of the WTRU 502 in an AT Command that is used to establish a PDU session. The WTRU hosted application can have information, such as configuration information from an application server, that certain traffic needs to be supported in alternative PDU sessions.

In step 1 511, the MT part 540 of the WTRU 502 may indicate to the 5GS that it needs to configure PDU sessions with an alternative indication. The WTRU 502 can further indicate whether the PDU session that it needs to establish is alternative or has an alternative. In other words, WTRU 502 can send an indication that the PDU session that the WTRU needs to establish is an alternative PDU session or is a primary PDU session). This indication may be sent as indication information.

In examples, the MT 540 can send this indication to the 5GS in a PDU Session Establishment request or a PDU Session Modification Request. The MT 540 may send a PDU Session Establishment request by sending a NAS message to the AMF 582. The AMF 582 may decapsulate the message and understand it is a NAS-session management (SM) message. The NAS-MM part of the message can also include an indication of alternative session, such as an alternative PDU session. This indication can be used by the AMF 582 in SMF selection. For example, if certain SMFs do not support the DROP/NO-DROP functionality for a PDU session, then the AMF 582 will not select this SMF for the PDU session requested. The AMF then forwards the NAS-SM message to the serving/selected SMF, such as SMF 583.

In step 2 512, the SMF 583 may send an SM policy association request to the PCF 590, including an alternative indication. The alternative indication may be included so that the PCF 590 can use the alternative indication to help determine what policy charging and control (PCC) Rules to provide to the SMF 583 for the PDU session.

In step 3 513, the PCF 590 can generate/update SM policies related to the PDU session. The SM policies may include one or more of PCC rules, N4 rules for the UPF 584, quality of service (QoS) rules for the WTRU 502, QoS profiles for the RAN node 504, and the like. The PCF 590 may decide to include an alternative indication in the rules themselves, for example, PCC rules, or QoS rules, instead of sending separate signaling about the alternative indication to WTRU 502, RAN 504 and UPF 584.

The alternative indication may indicate that this PDU session is or has an alternative PDU session. The alternative indication can also specify whether it is an alternative session or a PDU session that has an alternative.

The indication may also include a default state for the PDU session, i.e., whether the PDU session and or the network entity should go to a DROP state or a NO-DROP state by default. The default state may be assigned to a PDU session with an MT1, such as MT1 441 shown in FIG. 4, or the PDU session with an MT2, such as MT2 442, depending on pre-configuration or network assisted inference. The alternative indication can include certain triggers or conditions on the network entity level that can make it switch to a certain state. Such triggers or conditions can include an indication from the AS or other network entities, (for example, UPF 584, RAN node 504 or WTRU 502, to switch the state of the PDU session, or also the fact the network entities such as RAN node 504 or UPF 502 start exchanging data traffic related to this alternative PDU session, as described in embodiments and examples herein.

In step 4a 514, the PCF 590 may send the SM Policies to the SMF 583, and a confirmation of SM policy association with an alternative indication. In step 4b 515, the SMF 583 may send the alternative PDU session indication to the UPF 584. This alternative PDU session indication may be signaled to the UPF 584 by the SMF 583 via the N4 interface. This indication can also be included as part of the N4 rules that the SMF 583 will send to the UPF 584. The SMF 583 may also use the alternative PDU session indication to perform UPF selection for the considered PDU session. The message from the SMF 583 to the UPF 584 may also indicate to the UPF 584 whether the PDU should be placed in the DROP state or the NO-DROP state.

In step 4c 516, the SMF 583 may send an alternative PDU session indication to the RAN node 504 via an N2 signaling message. This message may be forwarded by the AMF 582 to the RAN node 504, in an example. The alternative PDU session indication can also be included in one or more QoS profiles related to the traffic carried in this PDU session if an alternative PDU session indication has been added by the PCF 590 in the one or more QoS profiles to the RAN node 504. The message from the SMF 583 to the RAN node 504 may also indicate to the RAN node 504 whether the PDU should be placed in the DROP state or the NO-DROP state.

In step 5 517, the SMF 583 may send a PDU Session Establishment Accept or PDU Session Modification Command to the WTRU 502 via the AMF 582. In an example in step 5 517, this message may be considered to be a PDU session establishment response message sent from SMF 583 to MT 540 of WTRU 502. This message confirms that the PDU session has been successfully established with an alternative indication. In an example, the indication may include information regarding one or more of: a state to take, if the state is a DROP state or a NO-DROP state, or perhaps some conditions to switch state as described elsewhere herein, for example in step 3 513. The WTRU may be provided with QoS rules that include an alternative PDU session indication if the PCF 590 has added this indication in step 3 513.

Figure 6:
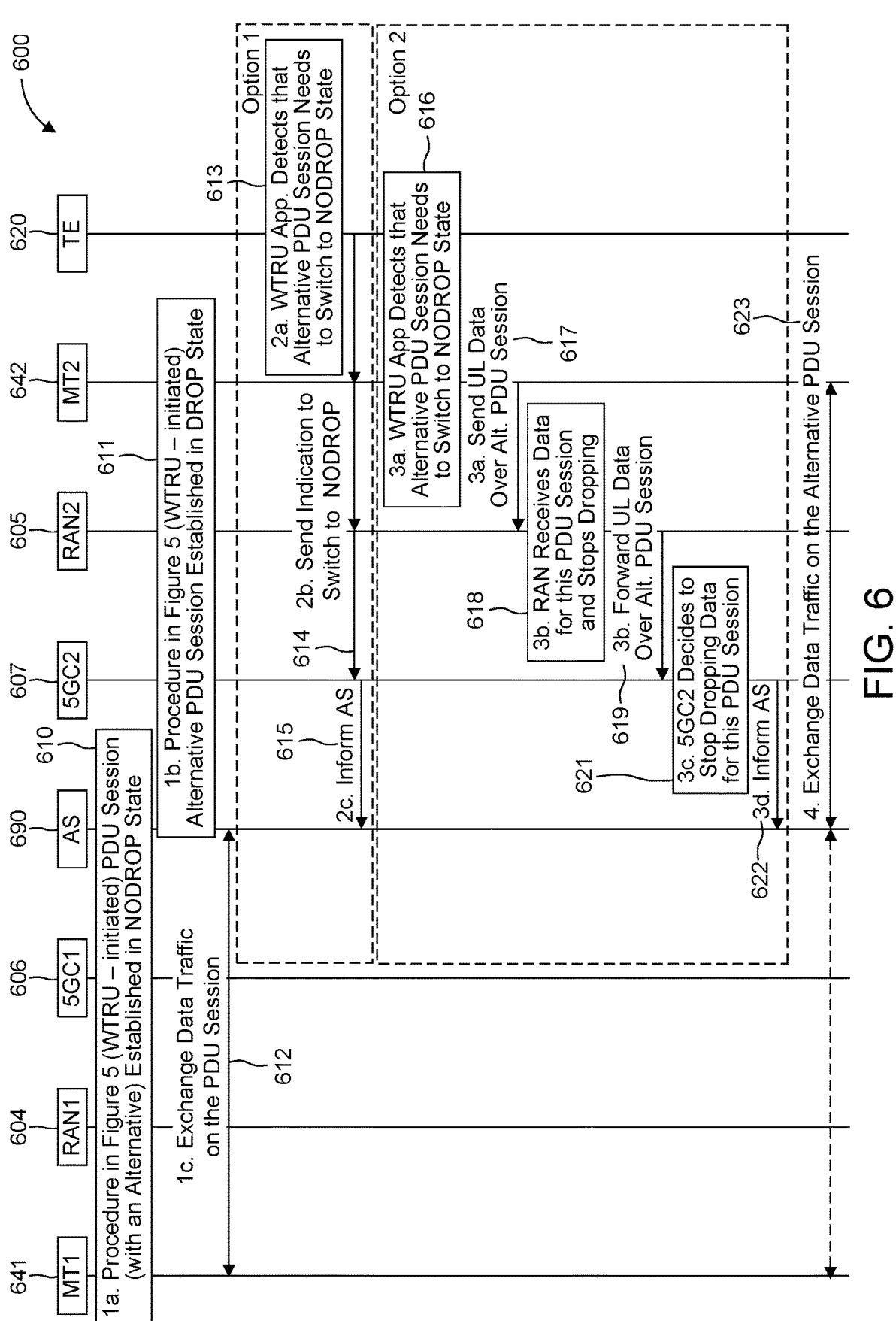
FIG. 6 is a signaling diagram illustrating an example of a WTRU initiated PDU session state change procedure.

FIG. 6 is a signaling diagram illustrating an example of a WTRU initiated PDU session state change procedure. An example in signaling diagram 600 shows a procedure for configuring dual WTRUs and coordinating the states of their redundant PDU sessions through WTRU assistance. Examples shown in FIG. 6 include a WTRU triggered change of PDU session state.

As described above, the WTRU may include a TE part 620 and at least two MTs, such as MT1 641 and MT2 642. In examples, the MTs do not communicate directly to each other, but rather the TE 620 can communicate to both MTs using, for example, AT commands. Further, in an example, both MT1 641 and MT2 642 may be in a single device. In another example, MT1 641 may be in one device and MT2 642 may be in another device.

The WTRU hosted application may, through pre-configuration by an application server for example, be able to detect the need for alternative PDU sessions related to some of its data exchanged with the AS. For simplicity, examples provided herein use 5GC1 606 and 5GC2 607 as actors in FIG. 6, without mentioning the 5GC network function or network functions involved. Yet, in the description herein, examples will describe which network functions are involved in the different steps.

In step 1a 610, the first device or MT1 641 is triggered to perform a WTRU-initiated alternative session configuration request procedure with the 5GS1 606. For example, this procedure may be performed as described in examples illustrated in FIG. 5. Prior to this event, the WTRU hosted application in the TE part 620 of the WTRU detects the need to establish PDU sessions with an alternative indication: one PDU session which has an alternative (related to MT1 641) and one PDU session which is an alternative PDU session (related to MT2 642). This alternative indication may be sent as indication information.

The TE 620 can communicate with MT1 641 via an AT command as described in FIG. 5. For the first PDU session, the alternative indication can be further specified to mean that this is a first PDU session, or primary PDU session, or a PDU session that has an alternative. The WTRU-initiated procedure for configuring this PDU session will also set the state of this PDU session (terminating at MT1 641) to a NO-DROP state. This means that the PDU session as well as network elements that serve this PDU session or terminate it, such as MT1 641, also carry the NO-DROP state. In an example, the network elements which serve this PDU session may include one or more of the RAN 1 node 604, 5GC1 606, or a UPF1 within 5GC1. Further, these network elements may serve MT1 641. In this way, a WTRU may initiate the establishment of a PDU session, with an alternative, in a NO-DROP state.

In step 1b 611, the second device or MT2 642 is triggered to perform a WTRU-initiated alternative PDU session configuration with the 5GS2 607, using the procedure described in examples illustrated in FIG. 5. For this PDU session, the alternative indication can be further specified to mean that this is an alternative PDU session. In this way, a WTRU may initiate the establishment of an alternative PDU session in a DROP state.

Once this procedure 611 is completed, this PDU session is put in a DROP state. This also means that MT2 642 as well as the RAN2 Node 605, 5GC2 607 and UPF2 within 5GC2 607 that is serving MT2 642 are also in the DROP state.

In step 1c 612, once both PDU sessions are successfully established with possibly different networks, such as 5GC1 606 and 5GC2 607, WTRU may start to send and receive data from 5GC1 606, or more precisely with UPF1 within 5GC1 606. Accordingly, data may be exchanged on the PDU session, since it is in a NO-DROP state. Since the alternative PDU session is in the DROP state, data is dropped within this alternative PDU session, and within MT2 642, the RAN2 Node 605, 5GC2 607 and UPF2 within 5GC2 607.

Examples in this scenario use the fact that the WTRU hosted application at the TE 620 can detect that a certain session needs to switch state from a DROP state to a NO-DROP state. First of all, the WTRU hosted application can detect that a certain PDU session is encountering an issue by the number of data units that are lost within this PDU session. By counting the number of lost data units and certain thresholds, the WTRU hosted application in the TE 620 can determine that there is an issue with a certain PDU session, and hence the (other) alternative PDU session needs to stop dropping data, meaning it needs to switch to a NO-DROP state. The WTRU application can alternatively receive an indication of an issue with a PDU session from the application server and can use this information to decide that a data session needs to switch to a NO-DROP state.

The TE 620/WTRU hosted application in the TE 620 detecting that there is an issue in the PDU session of interest might reflect different scenarios. For example, a possible network entity failure such as UPF1 that is serving the data in MT1 641 or the failure of the RAN1 node 604 that is carrying the traffic might be reflected in the TE 620 detecting there is an issue with the PDU session. The TE 620 can decide that an alternative PDU session needs to be switched to a NO-DROP state, if the conditions of the first PDU session, for example the QoS parameters or performance, are not optimal. In this case, the TE 620 can decide that the assistance of the alternative PDU session is needed.

This example procedure provides two options for coordinating to switch the alternative PDU session to NO-DROP. In Option 1, once the WTRU detects that the alternative PDU session needs to switch to a NO-DROP state, as described in detail above, in step 2a 613, the WTRU may send this information/indication to the involved entities so that they are aware of the change of the state, and they switch their local state to the NO-DROP state. In an example, the detection, that the alternative PDU session needs to switch to a NO-DROP state, may be performed by an application hosted by the WTRU.

More specifically, in step 2b 614, the TE 620 may inform the MT2 642 that the alternative PDU session needs to switch to a NO-DROP state. For example, TE 620 may send indication information, indicating that the alternative PDU session needs to switch to a NO-DROP state, to MT2 642.

TE 620 can use AT commands to send this information, in an example. MT2 642 can switch its local state for this alternative PDU session to the NO-DROP state.

MT2 642 may then forward this indication information to the serving entities, including the RAN2 Node 605 and UPF2, within 5GC2 607, nodes. MT2 642 may send a message dedicated to the RAN2 Node 605 via a radio resource control (RRC) signaling message. MT2 642 can include indication information to the RAN2 Node 605 in this message that the state of alternative PDU session is switched to the NO-DROP state. The RAN2 Node 605 may send a notification of the state change to the AMF, SMF, and UPF. The AMF, SMF, and UPF may be within 5GC2 607, in an example. For example, it may be that the UPF does not need to know when the PDU session is in the drop state, for example, if the RAN2 Node 605 is responsible for dropping data. In this case, the RAN2 node 605 may not need to notify the UPF. However, if the UPF is responsible for dropping data, then the RAN2 node 605 may send a notification to the UPF that it may stop dropping data. Further, this notification may be sent via GPRS tunneling protocol (GTP) signaling and the N3 or N9 interface.

MT2 642 may also send a NAS message, for example, a PDU Session Modification Request, to the 5GC2 607 to indicate that the state of the PDU session needs to change. This NAS message may be carried in the RRC message to the RAN2 Node 605.

AMF2 can forward this message to the network functions of interest, for example, SMF2. SMF2 can send this indication to the serving UPF, such as UPF2, indicating that it needs to switch its state to the NO-DROP state for traffic related to the alternative PDU session.

In step 2c 615, 5GC2 607 can further inform the AS 690 that the data session carried within 5GC2 607 is now in a NO-DROP state. This indication may be sent to the AS 690 via an NEF notification.

In Option 2, the network may detect the need to stop dropping data by virtue of the fact that UL data for the PDU session is received from the WTRU. The network may recognize that it is receiving UL data because the WTRU application told the WTRU to stop dropping UL data. In this way, the MT2 642 is able to trigger the network to move the PDU session to the NO-DROP state so that DL data can be received by the WTRU.

In step 3a 616, the WTRU application may detect that an alternative PDU session needs to switch to a NO-DROP state. The WTRU application may decide to send data from TE 620 to MT2 642. MT2 642 may understand that it needs to stop dropping data for this PDU session and starts sending data to the 5GS2 607. In step 3a 617, MT2 642 may send UL data to the RAN2 node 605 over an alternative PDU session.

In step 3b 618, the RAN2 node 605, by virtue of receiving data related to this PDU session from MT2 642, may understand or may determine that the alternative PDU session switches state to the NO-DROP state. Further, RAN2 605 may start to forward 619 this data to the serving UPF, such as UPF2 within 5GC2 607. Accordingly, the RAN2 node 605 stops dropping data after receiving data for this PDU session. This understanding or this determination regarding the state can be configured in terms of triggering conditions to switch state. A condition to switch state to the NO-DROP state can be the fact the PDU session in question is in DROP state. In another example, the condition may be a certain amount of traffic related to this PDU session is being received from MT2 642. In a further example, both conditions may be satisfied to trigger a switching of the state.

In step 3c 621, UPF2 within 5GC2 607, by virtue of receiving data from the RAN2 Node 605 related to the alternative PDU session, may understand or may determine that the PDU session switches to the NO-DROP state. This switch can be achieved by configuring UPF, indicated for example in N4 rules, to understand or to determine conditions regarding if a) the PDU session state is the DROP state, and b) the UPF receives a certain amount of data related to this PDU session from the RAN2 Node 605. If one or both conditions are met, the UPF can switch state to the NO-DROP state and start forwarding data to the appropriate DN. Accordingly, 5GC2 607 may decide to stop dropping data for this PDU session.

In step 3d 622, the 5GC2 607 may inform the AS 690 that the data session is switched to the NO-DROP state, for example by notification from the NEF after subscription to state change from the AS 690 for the alternative PDU session.

For both options, once the alternative PDU session is switched to the NO-DROP state, in step 4 623, data traffic for this application may now be sent and received between MT2 642 and UPF2. In this way, data traffic may be exchanged on the alternative PDU session.

The data traffic can still be exchanged between MT1 641 and UPF1, optionally. For example, data may still be exchange between MT1 641 and UPF1 if the network conditions decrease the QoE of the PDU session but the WTRU, the/AS 690 or both still want to keep exchanging traffic as well in this first PDU session.

Figure 7:
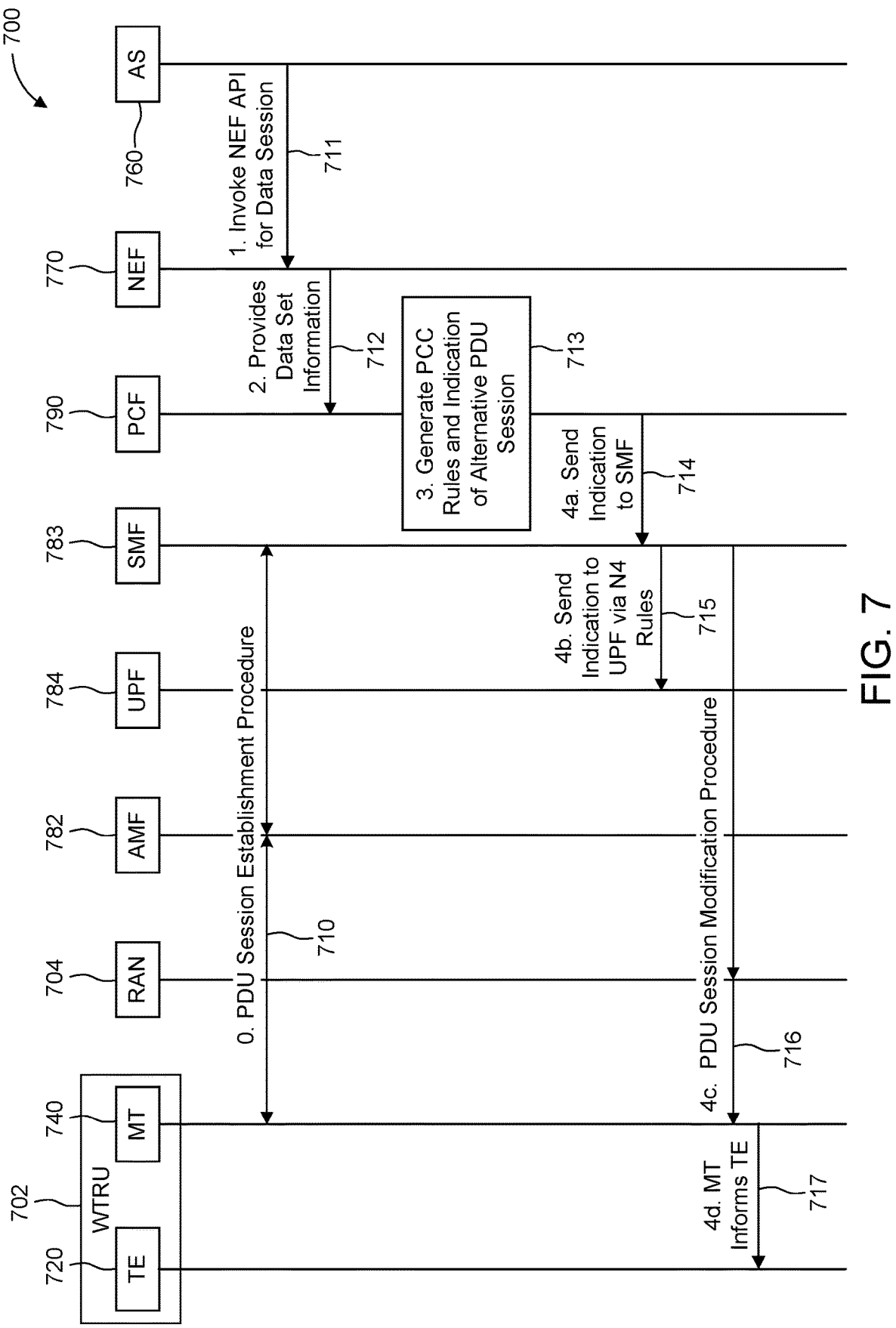
FIG. 7 is a signaling diagram illustrating an example of an application server (AS) initiated alternative PDU session.

FIG. 7 is a signaling diagram illustrating an example of an AS initiated alternative PDU session. An example in signaling diagram 700 illustrates an alternative method for configuring alternative PDU sessions where the procedure is initiated by an AS, such as AS 760. The AS request may be sent to the 5GS through interaction with the NEF network function. The AS 760 may indicate in this request that a data session has an alternative indication. This indication might mean that the data session or PDU session that will carry this session traffic either has or is an alternative PDU session. In this way, the AS 760 may change a PDU session to an alternative PDU session. The indication may be sent as indication information.

As mentioned above, this configuration procedure applies to both the configuration of a PDU session that is alternative or has an alternative. It is elsewhere herein described how this procedure is used to provide redundancy for this application data.

In an initial step, such as step 0 710, a WTRU 702 may perform a PDU session establishment procedure with the 5GS. In an example, WTRU 702 may establish a PDU session. Specifically, in an example, WTRU 702 may send a PDU session establishment request message to SMF 783 via AMF 782. In this step, no alternative indication or information is provided for this PDU session, and traffic for data carried in this PDU session is exchanged between WTRU 702 and serving UPF 784 as usual.

At a certain point, such as in step 1 711, the AS 760 provides service information regarding the application data with an alternative session indication. The AS 760 may provide this information by invoking an NEF API. In an example, AS 760 may invoke the NEF API for a data session and provide information to NEF 700, accordingly. For example, the AS 760 can invoke an API like the Nne-f_AFSessionWithQoS API. In this request, the AS 760 can include one or more of: flow description(s), WTRU IP address(es), service requirements, QoS Reference(s), QoS parameter(s), or the like. The AS 760 may also include an alternative indication. This alternative indication can mention that this data session has an alternative data session or is an alternative data session. This alternative indication may also include whether the data session (and subsequently the PDU session) and network entities involved need to be in a DROP state or a NO-DROP state, or which default state the data session needs to be put on. This change of state can be triggered by an indication from the AS 760 or other wireless communications system entities, (for example, UPF 784, RAN 704 or WTRU 702, to switch the state of the PDU session, or also the fact that the network entities such as RAN 704 or UPF 784 start exchanging data traffic related to this alternative PDU session, as described elsewhere herein.

In step 2 712, once the NEF 770 authorizes the AS request, the NEF 770 provides the PCF 790 with service information and requirements including alternative indication information. In an example, NEF 700 may provide PCF 790 with data set information associated with the alternative indication information.

In step 3 713, the PCF 790 can use this information to generate PCC rules for the service flows. The PCF 790 may also generate alternative PDU session indication information to inform to other network functions. For example, the PCF 790 may generate alternative PDU session indication information. The PCF 790 may generate corresponding N4 rules for UPF 784, QoS rules for WTRU 702 and QoS profiles for RAN node 704. The PCF 790 can include the alternative PDU session indication information in these rules or choose to send the alternative PDU session indication information separately.

The alternative PDU session indication information may indicate that this PDU session is or has an alternative PDU session. Also, the PDU session indication may specify whether it is an alternative session or a PDU session that has an alternative.

The alternative PDU session indication information may also include a default state to take by the PDU session and the entity receiving the indication information. For example, the alternative PDU session indication information may include information specifying whether the PDU session, the network entity, or both, should go to a DROP state or a NO-DROP state by default. The default state may be assigned to a PDU session with MT1 or the PDU session with MT2 depending on pre-configuration or network assisted inference. In an example, MT1 may be MT1 441, and MT2 may be MT2 442 in FIG. 4.

The alternative PDU session indication information can include certain triggers or conditions on the network entity level that can make a network entity switch to a certain state. Such triggers or conditions may include an indication from the AS 760 or other wireless communications system entities, for example, UPF 784, RAN node 704 or WTRU 702, to switch the state of the PDU session. Further, such triggers or conditions may also include the fact that the network entities such as RAN node 704 or UPF 784 start exchanging data traffic related to this alternative PDU session, as described elsewhere herein.

In step 4a 714, the PCF 790 sends PCC rules to the SMF 783, including the alternative PDU session indication information. In step 4b 715, the SMF 783 sends the alternative PDU session indication information to the UPF 784. This alternative PDU session indication information may be signaled to the UPF 784 by the SMF 783. This indication information may also be included as part of the N4 rules that the SMF 783 will send to the UPF 784. The SMF 783 may also use the alternative PDU session indication information to perform UPF re-selection for the considered PDU session.

In step 4c 716, the SMF 783 sends alternative PDU session indication information to the RAN node 705. In an example, the alternative PDU session indication information may be sent via N2 signaling message. This message alternative PDU session indication information may be forwarded by the AMF 782 to the RAN node 704, in an example. The alternative PDU session indication information can also be included in the QoS profiles related to the traffic carried in this PDU session if alternative indication information has been added by the PCF 790 in the QoS profiles sent to the RAN node 704. Also, in step 4c 716, a PDU Session Modification Command may be sent to the WTRU 702, where new QoS parameters and requirements, and alternative PDU session indication information, may be sent to the WTRU 702. In this way, a PDU session modification procedure may be performed.

At the end of this step 716, the PDU session has been successfully modified with the alternative PDU session indication information. (For example, the PDU session may have been modified regarding what state to take, such as if the session is in a DROP state or a NO-DROP state. In an example, the PDU session may have been modified based on some conditions to switch state. The WTRU 702 may be provided with QoS rules that include the alternative PDU session indication if the PCF 790 has added this indication in step 3 713.

Additionally, in step 4d 717, the MT part 740 of the WTRU 702 can inform the TE part 720, or the WTRU 702 hosted application, that the data session regarding its traffic now has an alternative indication and which state the PDU session is set to. For example, the PDU session may be set to a (DROP state. In another, the PDU session is set to a NO-DROP state.

In the above scenario, the PCF 790 may configure the WTRU 702 with alternative indication information, using URSP rules. In fact, the alternative indication information received by the PCF 790 may trigger the PCF 790 to create, update, or both URSP rules for the WTRU 702 to take the alternative indication into consideration.

For example, the new URSP rules, updated URSP rules, or both may have Route Selection Descriptors (RSDs) that include an indication that the PDU session for the traffic that matches the traffic descriptor of the URSP rule, needs to be an alternative PDU session or have an alternative.

Additionally, other parameters of the RSD, such as S-NS-SAI value, can be used to determine whether a PDU session is alternative. If a certain S-NSSAI value can indicate that the PDU session established under this S-NSSAI is assumed to be alternative, then S-NSSAI can be an indicator of whether the PDU session is of an alternative nature.

Once PCF generates, updates, or both the URSP rules, it sends these URSP rules to the WTRU using WTRU configuration update procedure (UCU).

Figure 8:
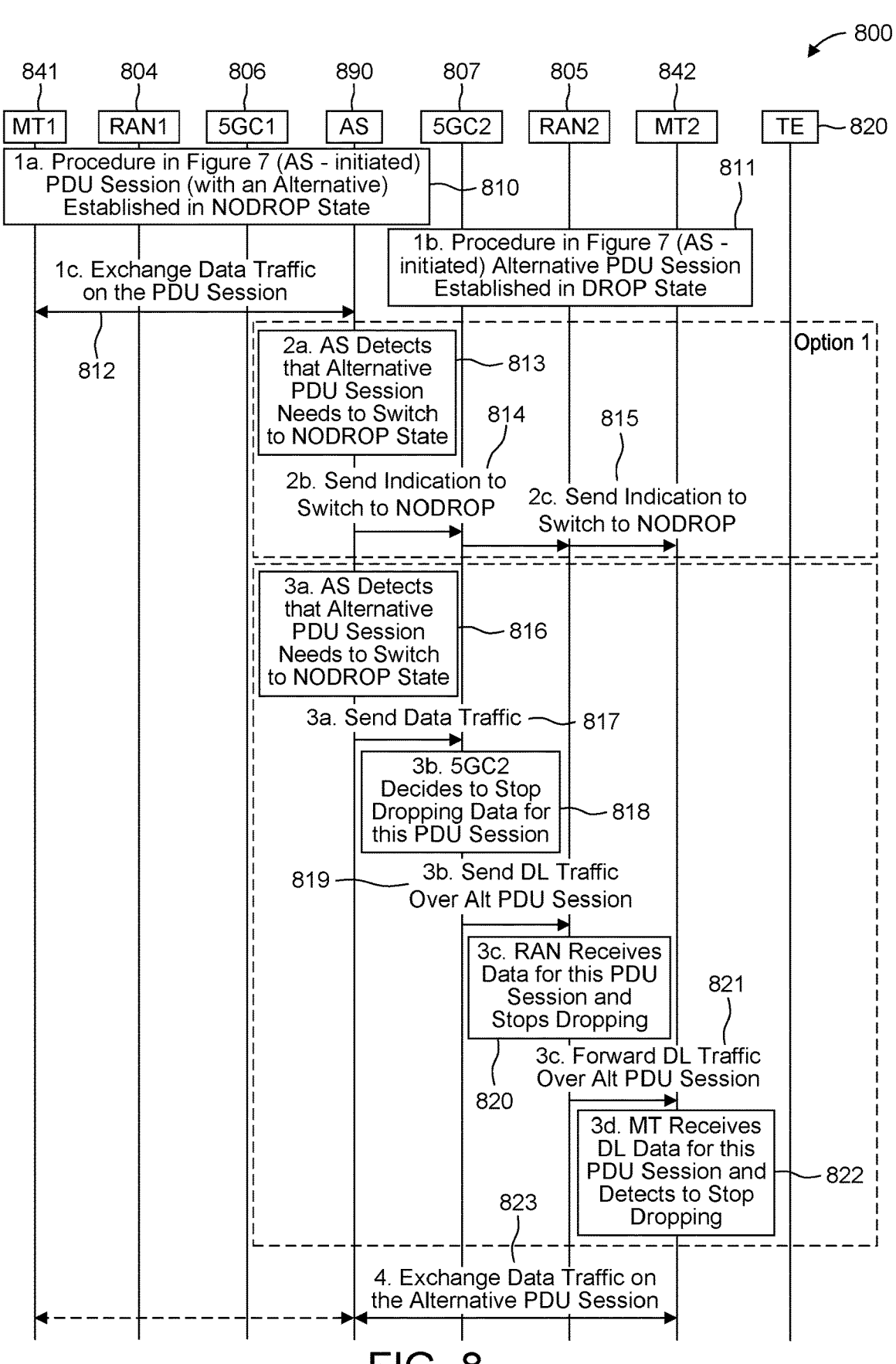
FIG. 8 is a signaling diagram illustrating an example of a network initiated PDU session state change procedure.

FIG. 8 is a signaling diagram illustrating an example of a network initiated PDU session state change procedure. An example in signaling diagram 900 shows a procedure where an AS 890 may trigger the change of a PDU session state.

In step 1a 810, the first device or MT1 841 is triggered to perform an AS-initiated alternative session configuration procedure, request procedure, or both with the 5GS1 806. Prior to this event, the AS 890 provides service information and requirements for the different 5GSs, such as through NEF1 and NEF2 not shown in FIG. 8, to configure PDU sessions with an alternative indication: one PDU session which has an alternative (related to MT1 841) and one PDU session which is an alternative PDU session (related to MT2 842). For the first PDU session, the alternative indication can be further specified to mean that this is a first PDU session, or primary PDU session, or a PDU session that has an alternative. The AS-initiated procedure for configuring this PDU session will also set the state of this PDU session (terminating at MT1 841) to a NO-DROP state. This means that the PDU session as well as network elements that serve this PDU session or terminate it (MT1) may also carry the NO-DROP state. The network elements that serve this PDU session may include one or more of the RAN1 node 804, 5GC1 806, or UPF1 within 5GC1 806 serving MT1 841. In this way, an AS-initiated PDU session, with an alternative, may be established in a NO-DROP state.

In step 1b 811, the second device or MT2 842 is triggered to perform an AS-initiated alternative PDU session configuration with the 5GS2 807. In an example, the second device or MT2 842 may perform the AS-initiated alternative PDU session configuration using the procedure described in FIG. 7. For this PDU session, the alternative indication can be further specified to mean that this is an alternative PDU session.

Once this procedure is completed, this PDU session is put in a DROP state. This also means that MT2 842 as well as the RAN2 Node 805, 5GC2 807 and UPF2 within 5GC2 807 that is serving MT2 842 are also in DROP state. In this way, an AS-initiated alternative PDU session may be established in a DROP state.

In step 1c 812, once both PDU sessions are successfully established with possibly different networks, such as with 5GS1 806 and 5GS2 807, the WTRU may start to send and receive data from 5GC1 806, or more precisely with UPF1 within 5GC1. Accordingly, data traffic is exchanged on the PDU session.

Since the alternative PDU session is in DROP state, data is dropped within this PDU session, and within MT2 842, RAN2 Node 805, 5GC2 807 and the UPF2, within 5GC2 807.

In this example scenario, we use the fact that the AS 890 is able to detect that a certain session needs to switch state from a DROP state to a NO-DROP state. For example, this detection may be done by counting the number of data units that are lost or within this PDU session and perhaps using a certain threshold. In another example, this detection may be done if the conditions of the first PDU session, for example the QoS parameters or performance, are not optimal. In this case, the AS 890 can decide that the assistance of the alternative PDU session is needed.

Examples provided herein include two options for coordinating to switch the alternative PDU session to a NO-DROP state. A first option may be referred to as Option 1 and a second option may be referred to as Option 2, in the examples.

In Option 1, once the AS 890 detects that the alternative PDU session needs to switch to a NO-DROP state in step 2a 813, the AS 890 may send this indication to the involved 5GS2 entities. This indication may be sent as indication information, in an example.

More specifically, in step 2b 814, the AS 890 may inform the NEF2, within 5GC2 807, that the alternative PDU session needs to switch to a NO-DROP state. The session may be identified by an IP 5 Tuple, or a WTRU ID/DNN/S-NSSAI combination.

NEF2 may then forward this indication to the serving entities, including PCF2, SMF2 or AMF2. In an example, PCF2, SMF2 or AMF2 may be within 5GC2 807.

SMF2 807 can send this indication to the serving UPF, such as UPF2, indicating that it needs to switch its state to the NO-DROP state for traffic related to the alternative PDU session.

In step 2c 815, SMF2 may send a NAS message to MT2 842. SMF2 can include an indication to the RAN2 Node 805 in this message that the state of alternative PDU session is switched to the NO-DROP state. This indication may be sent as indication information, in an example. This message may be first sent to AMF2, and then forwarded to the RAN2 Node 805, which may then send it to MT2 842 in an RRC message.

In Option 2, the WTRU may detect the need to stop dropping data by virtue of the fact that DL data for the PDU session is received. The WTRU may recognize that it is receiving DL data because the AS 890 told the network to stop dropping packets.

In step 3a 816, the AS 890 may detect that alternative PDU session needs to switch to a NO-DROP state. The AS 890 decides to send data traffic 817 to UPF2, accordingly. In an example, UPF2 may be within the 5GC2 807.

In step 3b 818, the serving UPF (UPF2) node by virtue of receiving data related to this PDU session from the AS 890, may understand that the alternative PDU session switches state to the NO-DROP state and starts to forward this data to the RAN2 node 805. Accordingly, the 5GC2 807, which may include the UPF2, may decide to stop dropping data for this PDU session. This understanding regarding the alternative PDU session can be configured in terms of triggering conditions to switch state. A condition to switch state to the NO-DROP state may include the fact the PDU session in question is in DROP state. Also, a condition to switch state to the NO-DROP state may include a certain amount of traffic related to this PDU session is being received from the AS 890. The UPF may send a notification to the SMF to indicate that the PDU session is no longer in the DROP state. Specifically, the UPF2 may send the notification to SMF2, and both UPF2 and SMF2 may be within 5GC2 807. Further, 5GC2 807 may send DL traffic over the alternative PDU session 819 to the RAN2 node 805.

Additionally or alternatively, the UPF may be configured with packet detection rules that may be used by the UPF to detect certain type of traffic and, when a certain type of traffic is detected, determine to move the PDU session out of the DROP state. The SMF may indicate to the UPF which packet detection rules should be used to detect when to move the WTRU out of the drop state. For example, the packet detection rules may be used to detect a series of retransmission attempts which may be indicative of a problem with the primary PDU session. In an example, the UPF may be UPF2 and the SMF may be SMF2, and both UPF2 and SMF2 may be within 5GC2 807.

In step 3c 820, the RAN2 node 805, by virtue of receiving data from UPF2 related to the alternative PDU session, may understand that the PDU session is switching to the NO-DROP state. Accordingly, the RAN2 node 805 may stop dropping data. For example, the RAN2 node 805 may determine that the PDU session is switching to the NO-DROP state based on a condition that the PDU session state is in a DROP state, and the RAN2 node 805 receives a certain amount of data related to this PDU session from UPF2. If this condition is met, the RAN2 node 805 can switch state to NO-DROP state and start forwarding DL data traffic over the alternative PDU session 921 to the WTRU/MT2 842. The UPF may send a notification to the SMF to indicate that the PDU session is no longer in the DROP state. The RAN2 node 805 may be configured to make the state determination based on the condition after being configured by an indication of the condition in, for example, QoS profiles.

In step 3d 822, MT2 842 by virtue of receiving data form the RAN2 node 805 related to the alternative PDU session, may understand that the PDU session switches to the NO-DROP state and may stop dropping data for this PDU session. In an example, MT2 842 may then provide the data to TE 820, may make the data available to an application in the WTRU, or may do both.

For both Option 1 and Option 2, once the alternative PDU session is switched to the NO-DROP state, in step 4 823, data traffic for this application may now be sent and received between MT2 842 and UPF2. Accordingly, AS 890 and MT2 842 may exchange data traffic on the alternative PDU session. The data traffic can still be exchanged between MT1 841 and UPF1, in an example. Further, UPF1 may be within 5GC1 806. In an example, the network conditions may decrease the QoS of the PDU session but the WTRU, the AS 890, or both may still want to keep exchanging traffic in this first PDU session as well as in the alternative PDU session.

In the example solutions above, it may be assumed that the TE 820 communicates with two MTs, MT1 841 and MT2 842, and that each MT is registering a PDU session, creating a PDU session, or both, on two different networks. In an example, the two different networks may include 5GC1 and 5GC2 with RAM node 804 and RAN2 node 805. It may also be assumed that no communication between the two different networks is taking place. Both MTs are still assumed not to communicate directly to each other, as describe embodiments and in examples elsewhere herein.

Embodiments and examples are provided herein of dual WTRUs in a device with network coordination. Examples herein describe how the networks can communicate with each other to coordinate dual WTRUs for reliability operations described elsewhere herein. (Further, examples herein describe creating an alternative PDU session, changing state for an alternative PDU session, or both.

In example scenarios described herein, communication between the network elements of the different networks may be possible when there are service agreements between operators. For example, the service agreements may occur in a handset roaming or WTRU roaming context.

In an example, two networks are able to interact through communication between PCFs from each network. Further, in an example, a PCF-1 belonging to 5GC1 may be a PCF that can receive information and notifications from the PCF that provides policies related to PDU session, such as PCC rules. PCF can, for example, inform PCF-1 if policies for a specific PDU session are successfully provisioned. PCF-1 can be a point of contact between 5GC1 and 5GC2. 5GC2 may host PCF-2, which may communicate with one or more other PCFs within 5GC2 that are related to the PDU session, such as PCC rules. PCF-1 and PCF-2 are not the same as the PCFs that provide PDU session with alternative indication, to make sure if a Fault occurred at serving PCF, the points of contact are not impacted. In an example, the points of contact may include PCF-1 and PCF-2 between 5GC1 and 5GC2.

PCF-1 and PCF-2 may communicate with each other via reference point N24 for example, which is used in the context of roaming and support communication between H-PCF and V-PCF. PCF-1 and PCF-2 can communicate using a similar interface, if N24 is restricted to roaming scenarios.

Figure 9:
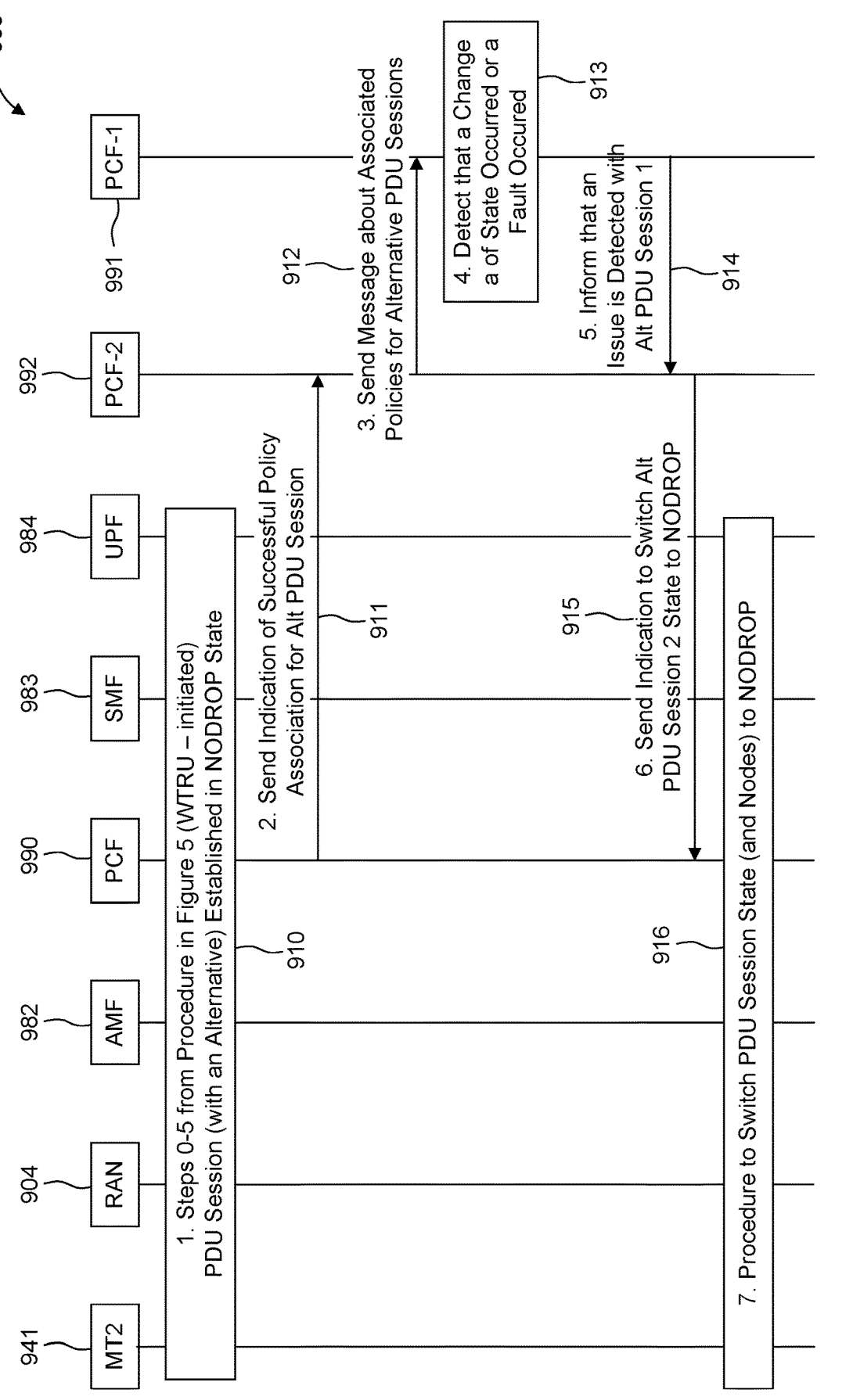
FIG. 9 is a signaling diagram illustrating an example of a PDU session creation and state change procedure with network coordination.

FIG. 9 is a signaling diagram illustrating an example of a PDU session creation and state change procedure with network coordination. An example illustrated in signaling diagram 900 shows how the coordination between the networks can be leveraged to assist the PDU session creation and state change.

In step 1 910, an alternative PDU session is configured using a WTRU-initiated procedure for alternative PDU session creation. In an example, the WTRU-initiated procedure for alternative PDU session creation may be the procedure seen as in examples shown in FIG. 5. For example, steps 0 through 5 from the procedure in examples shown in FIG. 5 may also be used in examples illustrated here to establish a PDU session, with an alternative, in a NO-DROP state. These steps 0 through 5 may be used by one or more of MT2 941, RAN 904, AMF 982, PCF 990, SMF 983 and UPF 984.

In step 2 911, the PCF 990 that is serving the policies related to session management communicates with PCF-2 992, which is the point of contact between 5GC2 and 5GC1, to inform it of the successful policy provisioning for certain PDU sessions. PCF 990 can indicate an alternative indication related to the alternative PDU session. Further, the information may include the policies that are related to this alternative PDU session, as well the current and default state of the PDU session, such as the DROP state for MT2 941. The PCF 990 can also include an ID that may be useful to associate the PDU session with its corresponding session on the other network. For example, PCF 990 can an alternative session ID or a DNN/S-NSSAI combination).

In step 3 912, PCF-2 992, in 5GC2, communicates with PCF-1 991, in 5GC1, to inform PCF-1 991 that policies related to an alternative PDU session have been successfully provisioned. PCF-2 992 can provide the alternative session ID, so that PCF-1 991 can use the ID to identify the associated corresponding PDU session in 5GC1. PCF-2 992 can include the PDU session state, including the default state. The default state may be assigned to a PDU session with MT1 941 or the PDU session with MT2 depending on pre-configuration or network assisted inference. PCF-2 992 also subscribes to receive notifications from PCF-1 991 related to policy updates, policy changes, or both related to PDU session 1 in 5GC1 and related to any issue that occurs to that PDU session. For example, the issues may include a faulty network entity, network congestion, poor network conditions and so on. PCF-2 992 can then receive notifications from PCF-1 991 if alternative PDU session 1 switches state from a NO-DROP state to a DROP state for example.

At this stage, both alternative PDU sessions are established with information known about each other thanks to PCF-1 and PCF-2 coordination. The alternative PDU session serving MT1 may be exchanging data since that session may be in a NO-DROP state, and the alternative PDU session serving MT2 941 may be in a DROP state.

In step 4 913, PCF-1 991 may detect that the alternative PDU session serving MT1 has an issue. This can mean that a network function serving this PDU session is faulty. This can also mean that the performance of the PDU session is poor or under a certain level. This can also mean that due to network performance problems such as congestion, this PDU session is having an issue. In this way, PFC-1 991 may detect that a change of state occurred or that a fault occurred.

In step 5 914, PCF-1 991 may send a notification to PCF-2 992 in order to inform PCF-2 992 that the alternative PDU session 1 has an issue. Additionally and alternatively, the notification may also inform PCF-2 992 that eventually the PDU session state will be or may be switched to DROP. In an example, PFC-1 991 may send the notification via the N24 interface. Further, the notification may include information indicating that the issue with the PDU session has been detected.

In step 6 915, after PCF-2 992 receives the ID of the alternative session that is having the issue in 5GS1, PCF-2 992 can send an indication to the serving PCF 990 that the PDU session and serving entities need to switch state from a DROP state to a NO-DROP state. For example, PCF-2 992 may send an indication to PCF 990 to switch alternative PDU session 2 to the NO-DROP state.

In step 7 916, the alternative PDU session in 5GS2 may switch state to the NO-DROP state along with its serving network entities and MT2 941. The serving network entities switching to the NO-DROP state may include one or more of the UPF 984, SMF 983, RAN 904, PCF 990. The data may now be exchanged through this alternative PDU session between the AS and MT2 941.

Embodiments and examples provided herein include dual WTRUs in a device with WTRU coordination. In embodiments and examples provided herein, the two MTs residing in the WTRU can communicate to each other directly through an internal interface, in addition to communication with each other via the TE as described in previous example solutions provided herein.

FIG. 10 is a signaling diagram illustrating an example of a PDU session creation and state change procedure with WTRU coordination. An example illustrated in FIG. 10 shows how WTRU communication can be leveraged to assist with coordination the dual WTRUs for reliability operations. This WTRU communication may be performed with MTs, in an example.

In steps 1a 1010, 1b 1011, and 1c 1012, similar to FIG. 5, MT1 1041 and MT2 1042 establish an alternative PDU session served by 5GS1 1006 and 5GS2 1007, respectively. Also, a first PDU session in 5GS1 1006 is put in a NO-DROP state and alternative PDU session in 5GS2 1007 in put in a DROP state. At this stage, data related to this traffic is exchanged between AS 1090 and MT1 1041.

In step 2 1013, MT1 1041 may detect that there is an issue with the first PDU session. For example, a TE can detect that there is an issue with the data session if it was able to count a data unit related to this application traffic, that, for example, exceeded a certain threshold, that is lost. MT1 1041 may have received an indication from the serving RAN1 node 1004 or from the 5GC1 1006 that the PDU session encountered an issue. In an example, the issue may be due to feedback from the AS 1090, or due to a faulty network element. MT1 1041 might detect that there is an issue with the first PDU session if it received a request from the RAN1 node 1004 or 5GC1 1006 to switch this PDU session to a DROP state. In this way, MT1 1041 may detect that a change of state occurred or that a fault occurred.

In step 3a 1014, MT1 1041 may send an indication to MT2 1042 that the first PDU has an issue or that the first PDU session switched state to a DROP state.

In step 3b 1015, MT2 1015 may deduce from the message sent by MT1 in step 3a 1014, that the alternative PDU session needs to switch state from a DROP state to a NO-DROP state.

In step 4 1016, a procedure, similar to previous embodiments and examples provided herein, may be performed to indicate to the network entities and RAN2 node 1005 that the alternative PDU session needs to switch state to the NO-DROP state. The network entities indicated may include one or more of 5GC2 1007 and AS 1090.

At this stage, the alternative PDU session state may be switched to the NO-DROP state as well as its serving entities. In an example, the serving entities may include the RAN2 node 1005, MT2 1042 and 5GC functions, such as those performed by 5GC2 1007. Accordingly, at step 5 1017, application data traffic can be exchange between AS 1090 and MT2 1042.

FIG. 11 is a flow diagram illustrating an example of a PCF coordination for an alternative PDU session. In an example shown in flow diagram 1100, a first PCF in a first network node may receive an indication from an SMF that a PDU session is an alternative PDU session, and an indication of whether the PDU session is in a drop state 1110. The first PCF may send a message with an indication to a second PCF in a second network node to indicate that the first network node is serving a PDU session that is an alternative PDU session 1120. In an example, the message with an indication to the second PCF may also identify the PDU session. Also, the first PCF may receive a message from the second PCF with an indication that a second PDU session has experienced a fault or degraded performance 1130. Further, the first PCF may send a message to the SMF to change the PDU session to a no-drop state.

In an example, the PDU Session may be identified with any combination of a session ID, a DNN, or an S-NSSAI. In another example, the message with an indication to the second PCF may indicate whether the PDU Session is in the drop state.

In a further example, the first network node may transmit downlink data to a WTRU when the PDU session is in a no-drop state. In an example, the downlink data may be URLLC data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, STA, AP, relay node, mesh node, customer premises equipment (CPE), fixed wireless access (FWA) device, industrial device, transmission and reception point (TRP), multi-TRP (M-TRP), vehicle, drone, or any host computer.

What is claimed:

1. A method for use in a first policy control function (PCF) in a first network node, the method comprising:

receiving an indication from a session management function (SMF) that a protocol data unit (PDU) session is an alternative PDU session, and an indication of whether the PDU session is in a drop state;

sending a message with an indication to a second PCF to indicate that the first network node is serving a PDU session that is the alternative PDU session, wherein the message with the indication to the second PCF also identifies the PDU session;

receiving a message from the second PCF with an indication that a second PDU session has experienced at least one of a fault or degraded performance; and sending a message to the SMF to change the PDU session to a no-drop state.

2. The method of claim 1, wherein the message with the indication to the second PCF further indicates whether the PDU Session is in the drop state.

3. The method of claim 1, wherein the PDU Session is identified with a session identity (ID).

4. The method of claim 1, wherein the PDU Session is identified with a data network name (DNN).

5. The method of claim 1, wherein the PDU Session is identified with a single network slice selection assistance information (S-NSSAI).

6. The method of claim 1, further comprising:

initiating a procedure to trigger the first network node to transmit downlink data to a wireless transmit receive unit (WTRU) when the PDU session is in the no-drop state.

7. The method of any claim 6, wherein the downlink data is ultra-reliable low latency (URLLC) data.

8. The method of claim 1, wherein the second PCF is in a second network node.

9. A first network node, including a first policy control function (PCF), the first network node comprising:

a transceiver; and a processor operatively coupled to the transceiver; wherein:

the transceiver is configured to receive an indication from a session management function (SMF) that a protocol data unit (PDU) session is an alternative PDU session, and an indication of whether the PDU session is in a drop state;

the transceiver and the processor are configured to send a message with an indication to a second PCF to indicate that the first network node is serving a PDU session that is the alternative PDU session, wherein the message with the indication to the second PCF also identifies the PDU session;

the transceiver is configured to receive a message from the second PCF with an indication that a second PDU session has experienced at least one of a fault or degraded performance; and the transceiver and the processor are configured to send a message to the SMF to change the PDU session to a no-drop state.

10. The first network node of claim 9, wherein the message with the indication to the second PCF further indicates whether the PDU Session is in the drop state.

11. The first network node of claim 9, wherein the PDU Session is identified with a session identity (ID).

12. The first network node of claim 9, wherein the PDU Session is identified with a data network name (DNN).

13. The first network node of claim 9, wherein the PDU Session is identified with a single network slice selection assistance information (S-NSSAI).

14. The first network node of claim 9, further comprising:

initiating a procedure to trigger the first network node to transmit downlink data to a wireless transmit receive unit (WTRU) when the PDU session is in the no-drop state.

15. The first network node of claim 14, wherein the downlink data is ultra-reliable low latency (URLLC) data.

16. The first network node of claim 9, wherein the second PCF is in a second network node.

* * * * *